(12) United States Patent
Hyon et al.

(10) Patent No.: US 12,134,058 B2
(45) Date of Patent: Nov. 5, 2024

(54) FILTER CLEANER AND AIR-PROCESSING APPARATUS INCLUDING FILTER CLEANER

(71) Applicant: LG ELECTRONICS INC., Seoul (KR)

(72) Inventors: Chinsoo Hyon, Seoul (KR); Sehwan Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 17/742,706

(22) Filed: May 12, 2022

(65) Prior Publication Data

US 2022/0370942 A1    Nov. 24, 2022

(30) Foreign Application Priority Data

May 24, 2021   (KR) .................. 10-2021-0065984
May 24, 2021   (KR) .................. 10-2021-0065985

(51) Int. Cl.
*B01D 46/00*   (2022.01)
*B01D 46/04*   (2006.01)
*F24F 8/10*    (2021.01)

(52) U.S. Cl.
CPC .............. *B01D 46/04* (2013.01); *F24F 8/10* (2021.01)

(58) Field of Classification Search
CPC ....... F24F 8/10–194; F24F 13/28; A47L 5/30; B08B 5/043; B01D 46/04

(Continued)

(56) References Cited

U.S. PATENT DOCUMENTS 5,595,068 A    1/1997  Amr
10,989,429 B2  4/2021  Okamoto et al.
(Continued)

FOREIGN PATENT DOCUMENTS

CN     1707169     12/2005
CN    101048621    10/2007
(Continued)

OTHER PUBLICATIONS

European Search Report dated Oct. 14, 2022 issued in EP Application No. 22173504.6.
(Continued)

*Primary Examiner* — T. Bennett Mckenzie
(74) *Attorney, Agent, or Firm* — KED & Associates LLP

(57) ABSTRACT

A filter cleaner and an air-processing apparatus including a filter cleaner are provided. The filter cleaner may include a housing that forms an external appearance and having a suction hole formed in a first side thereof and a discharge hole formed in a second side thereof, a moving gear rotatably disposed in the housing and configured to move the housing, a gear motor configured to rotate the moving gear, a dust container disposed so as to be introduced into or withdrawn out of the housing and configured to store foreign substances introduced thereinto through the suction hole and to accommodate an agitator rotatably disposed therein, an agitator gear disposed inside of the housing to rotate the agitator, an agitator motor disposed inside of the housing to operate the agitator gear, and a suctioner disposed inside of the housing to induce air to flow into the dust container through the suction hole.

20 Claims, 24 Drawing Sheets

(58) Field of Classification Search
USPC .................................................. 55/295–302
See application file for complete search history.

(56) References Cited

U.S. PATENT DOCUMENTS

| | | | |
|---|---|---|---|
| 2002/0189274 A1 | 12/2002 | Lee et al. | |
| 2006/0032260 A1 | 2/2006 | Kang | |
| 2010/0040457 A1 | 2/2010 | Tsen | |
| 2011/0143899 A1* | 6/2011 | Wirth | A01D 46/12 |
| | | | 264/239 |
| 2012/0151885 A1* | 6/2012 | Nishihata | B01D 46/681 |
| | | | 55/289 |
| 2017/0191677 A1 | 7/2017 | Jeong et al. | |
| 2018/0017282 A1 | 1/2018 | Liu et al. | |
| 2018/0017284 A1 | 1/2018 | Oishi et al. | |
| 2019/0049137 A1 | 2/2019 | Kojima et al. | |
| 2019/0199960 A1* | 6/2019 | Miyazaki | H04N 9/3144 |
| 2019/0275455 A1 | 9/2019 | Choi et al. | |

FOREIGN PATENT DOCUMENTS

| | | |
|---|---|---|
| CN | 101370676 | 2/2009 |
| CN | 102460031 | 5/2012 |
| CN | 202747532 | 2/2013 |
| CN | 206682042 | 11/2017 |
| CN | 108180547 | 6/2018 |
| CN | 108387133 | 8/2018 |
| CN | 109790998 | 5/2019 |
| CN | 110332611 | 10/2019 |
| CN | 209763287 | 12/2019 |
| CN | 210050921 | 2/2020 |
| CN | 107250683 | 4/2020 |
| CN | 210463497 | 5/2020 |
| CN | 111637508 | 9/2020 |
| CN | 211977205 | 11/2020 |
| DE | 20 2007 001 644 | 7/2007 |
| DE | 10 2018 219 702 | 5/2020 |
| EP | 1 271 065 | 1/2003 |
| EP | 2 058 602 | 5/2009 |
| EP | 2 381 182 | 10/2011 |
| EP | 2 426 429 | 3/2012 |
| EP | 2725306 | 4/2014 |
| EP | 3 406 980 | 11/2018 |
| EP | 3 690 328 | 8/2020 |
| JP | H06-106967 | 4/1994 |
| JP | H06-147531 | 5/1994 |
| JP | H07-225046 | 8/1995 |
| JP | 08-05091 | 1/1996 |
| JP | H08-226668 | 9/1996 |
| JP | 08-270978 | 10/1996 |
| JP | 2001-263788 | 9/2001 |
| JP | 2003-148763 | 5/2003 |
| JP | 2004-101094 | 4/2004 |
| JP | 2005-172261 | 6/2005 |
| JP | 2005-214429 | 8/2005 |
| JP | 2006-145192 | 6/2006 |
| JP | 2006-162217 | 6/2006 |
| JP | 2007-024345 | 2/2007 |
| JP | 2008-039293 | 2/2008 |
| JP | 2008-069985 | 3/2008 |
| JP | 2008-122055 | 5/2008 |
| JP | 2008-133973 | 6/2008 |
| JP | 2008-164190 | 7/2008 |
| JP | 2008-224133 | 9/2008 |
| JP | 2008-241054 | 10/2008 |
| JP | 2008-267795 | 11/2008 |
| JP | 2009-002602 | 1/2009 |
| JP | 2009-186077 | 8/2009 |
| JP | 2012-013392 | 1/2012 |
| JP | 2014-077599 | 5/2014 |
| JP | 2014-129954 | 7/2014 |
| JP | 2017-524119 | 8/2017 |
| JP | 2019-170863 | 10/2019 |
| KR | 10-1999-0068938 | 9/1999 |
| KR | 20-0164654 | 2/2000 |
| KR | 20-0184583 | 6/2000 |
| KR | 10-2003-0053864 | 7/2003 |
| KR | 10-2004-0056151 | 6/2004 |
| KR | 20-0380530 | 3/2005 |
| KR | 10-0487474 | 5/2005 |
| KR | 10-2005-0122523 | 12/2005 |
| KR | 10-2006-0119068 | 11/2006 |
| KR | 10-0787501 | 12/2007 |
| KR | 10-2008-0026287 | 3/2008 |
| KR | 10-2008-0058732 | 6/2008 |
| KR | 10-2008-0078199 | 8/2008 |
| KR | 10-2009-0017290 | 2/2009 |
| KR | 10-2009-0052609 | 5/2009 |
| KR | 10-2009-0081607 | 7/2009 |
| KR | 10-0921921 | 10/2009 |
| KR | 10-2010-0036919 | 4/2010 |
| KR | 10-2012-0034446 | 4/2012 |
| KR | 10-2013-0108749 | 10/2013 |
| KR | 10-2014-0056465 | 5/2014 |
| KR | 10-2015-0018201 | 2/2015 |
| KR | 10-2015-0086092 | 7/2015 |
| KR | 10-2017-0080102 | 7/2017 |
| KR | 10-2018-0066546 | 6/2018 |
| KR | 10-2018-0126217 | 11/2018 |
| KR | 10-2019-0106608 | 9/2019 |
| KR | 10-2019-0106684 | 9/2019 |
| KR | 10-2019-0107784 | 9/2019 |
| KR | 20190106684 A * | 9/2019 ......... B01D 46/0065 |
| KR | 1020190106684 A * | 9/2019 |
| KR | 10-2111216 | 5/2020 |
| KR | 10-2020-0106401 | 9/2020 |
| KR | 10-2020-144534 | 12/2020 |
| KR | 10-2021-0005979 | 1/2021 |
| KR | 10-2021-0005980 | 1/2021 |
| KR | 10-2021-0007010 | 1/2021 |
| RU | 2 347 149 | 12/2007 |
| WO | WO 2004/070283 | 8/2004 |
| WO | WO 2004/079271 | 9/2004 |
| WO | WO 2006/043430 | 4/2006 |
| WO | WO 2010/047443 | 4/2010 |
| WO | WO 2011/043123 | 4/2011 |
| WO | WO 2016/121071 | 8/2016 |
| WO | WO 2019/167313 | 9/2019 |
| WO | WO 2021/053985 | 3/2021 |

OTHER PUBLICATIONS

Korean Office Action dated Oct. 18, 2022 issued in KR Application No. 10-2021-0065984.
Korean Office Action dated Oct. 18, 2022 issued in KR Application No. 10-2021-0065986.
European Search Report dated Oct. 21, 2022 issued in EP Application No. 22173436.1.
India Office Action dated Dec. 9, 2022 issued in IN Application No. 202214012610.
Korean Office Action dated Apr. 14, 2023 issued in Application No. 10-2021-0065985.
Korean Office Action dated Jul. 6, 2022 issued in Application No. 10-2021-0065983.
Japanese Office Action issued in Application No. 2022-083486 dated Jun. 20, 2023.
Japanese Office Action issued in Application No. 2022-082791 dated Jun. 6, 2023.
Korean Notice of Allowance issued in Application No. 10-2021-0174218 dated Jul. 27, 2023.
Japanese Office Action dated Jul. 4, 2023, issued in Application No. 2022-081386.
India Office Action dated Jan. 3, 2023 issued in IN Application No. 202214012884.
Korean Office Action dated Jan. 9, 2023 issued in KR Application No. 10-2021-0065989.
Korean Office Action issued in Application No. 10-2021-0174217 dated Mar. 10, 2023.
Korean Office Action issued in Application No. 10-2021-0174215 dated Mar. 10, 2023.

(56) References Cited

OTHER PUBLICATIONS

Korean Office Action issued in Application No. 10-2021-0174218 dated Mar. 20, 2023.
European Search Report dated Oct. 19, 2022 issued in EP Application No. 22173409.8.
European Search Report dated Oct. 28, 2022 issued in EP Application No. 22173423.9.
European Search Report dated Nov. 7, 2022 issued in EP Application No. 22173506.1.
India Office Action dated Nov. 29, 2022 issued in IN Application No. 202214012895.
India Office Action dated Dec. 1, 2022 issued in IN Application No. 202214012883.
India Office Action dated Dec. 6, 2022 issued in IN Application No. 202214012894.
Korean Office Action dated Jan. 9, 2023 issued in KR Application No. 10-2021-0065987.
India Office Action dated Nov. 29, 2022 issued in IN Application No. 202214012882.
Japanese Office Action issued in Application No. 2022-082832 dated May 30, 2023.
Korean Notice of Allowance issued in Application No. 10-2021-0174215 dated Jul. 27, 2023.
European Search Report dated Oct. 13, 2022 issued in EP Application No. 22173411.4.
U.S. Appl. No. 17/742,706, filed May 12, 2022.
U.S. Appl. No. 17/742,758, filed May 12, 2022.
U.S. Appl. No. 17/742,564, filed May 12, 2022.
U.S. Appl. No. 17/742,650, filed May 12, 2022.
U.S. Appl. No. 17/743,088, filed May 12, 2022.
U.S. Appl. No. 17/742,785, filed May 12, 2022.
Chinese Office Action dated Jun. 3, 2024 issued in Application No. 202210557584.7.

* cited by examiner

FIG. 24
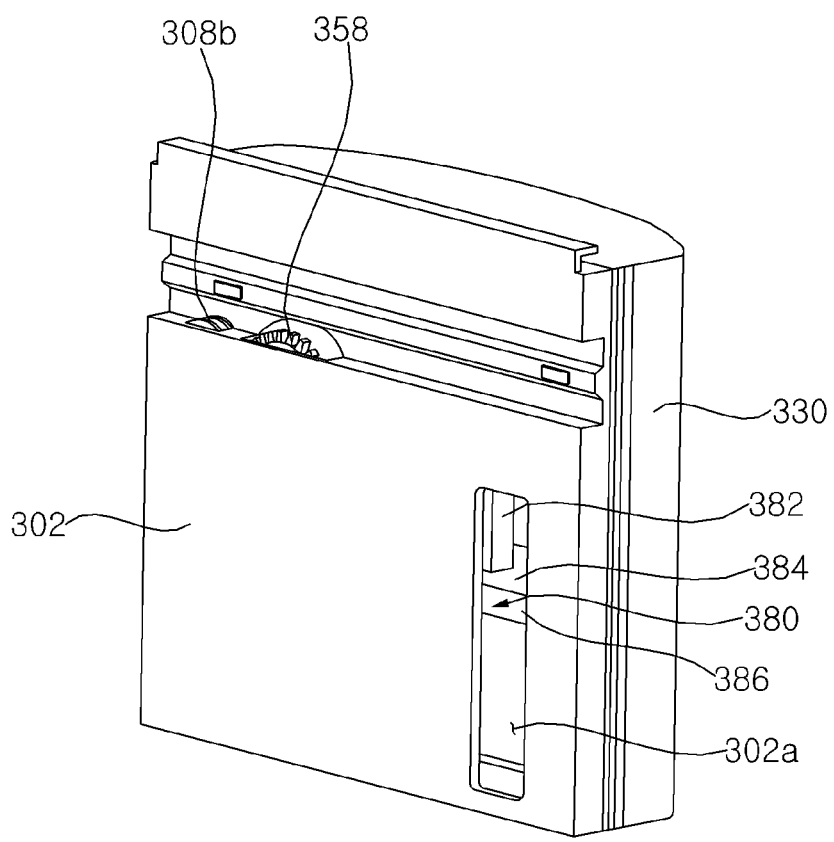
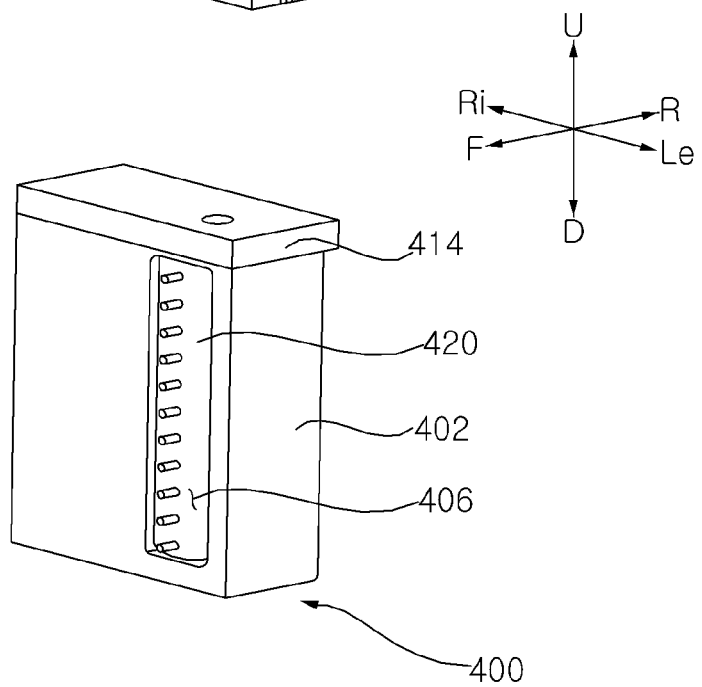

FILTER CLEANER AND AIR-PROCESSING APPARATUS INCLUDING FILTER CLEANER

CROSS-REFERENCE TO RELATED APPLICATION(S)

This application claims priority under 35 U.S.C. § 119 to Korean Application Nos. 10-2021-0065984 and 10-2021-0065985 filed in Korea on May 24, 2021, whose entire disclosures are hereby incorporated by reference.

BACKGROUND

1. Field

A filter cleaner and an air-processing apparatus including a filter cleaner are disclosed herein.

2. Background

An air-processing apparatus may include an air conditioner, configured to discharge heat-exchanged air, and an air purifier, configured to discharge filtered air. A filter that removes foreign substances from air flowing into the air-processing apparatus may be disposed in or at an inlet of the air-processing apparatus.

While the air-processing apparatus is used, foreign substances collect in the filter disposed in the inlet. Thus, if the filter is not periodically maintained, air containing foreign substances may be discharged from the air-processing apparatus.

Korean Patent Laid-Open Publication No. 10-2020-0106401, which is hereby incorporated by reference, discloses a filter cleaner that cleans a filter disposed at a rear side of an air conditioner. The disclosed filter cleaner is used for a stand-type air conditioner, and is structured so as to move in an upward-downward direction. Therefore, it is difficult to apply this conventional filter cleaner to a product having an inlet formed in a leftward-rightward direction.

The filter cleaner removes foreign substances from the filter using an agitator, and collects the foreign substances removed from the filter in a dust container. Thus, the foreign substances removed from the filter may be present all over the agitator and the dust container.

Also, due to the structure of the filter cleaner, it may be difficult to separate and replace the dust container or the agitator. Further, as for the filter cleaner disclosed in the above-mentioned document, which is used in a stand-type air conditioner, a user may easily separate the dust container. However, in the case of a filter cleaner for use in a ceiling-mounted air conditioner, a user has difficulty reaching the same, and thus, has difficulty separating and replacing the dust container. Furthermore, when the dust container is separated, foreign substances contained in the dust container may escape to the outside.

BRIEF DESCRIPTION OF THE DRAWINGS

Embodiments will be described in detail with reference to the following drawings in which like reference numerals refer to like elements, and wherein:

FIG. 24 is a perspective view showing a state in which the dust container is separated from the filter cleaner.

DETAILED DESCRIPTION

Figure 1:
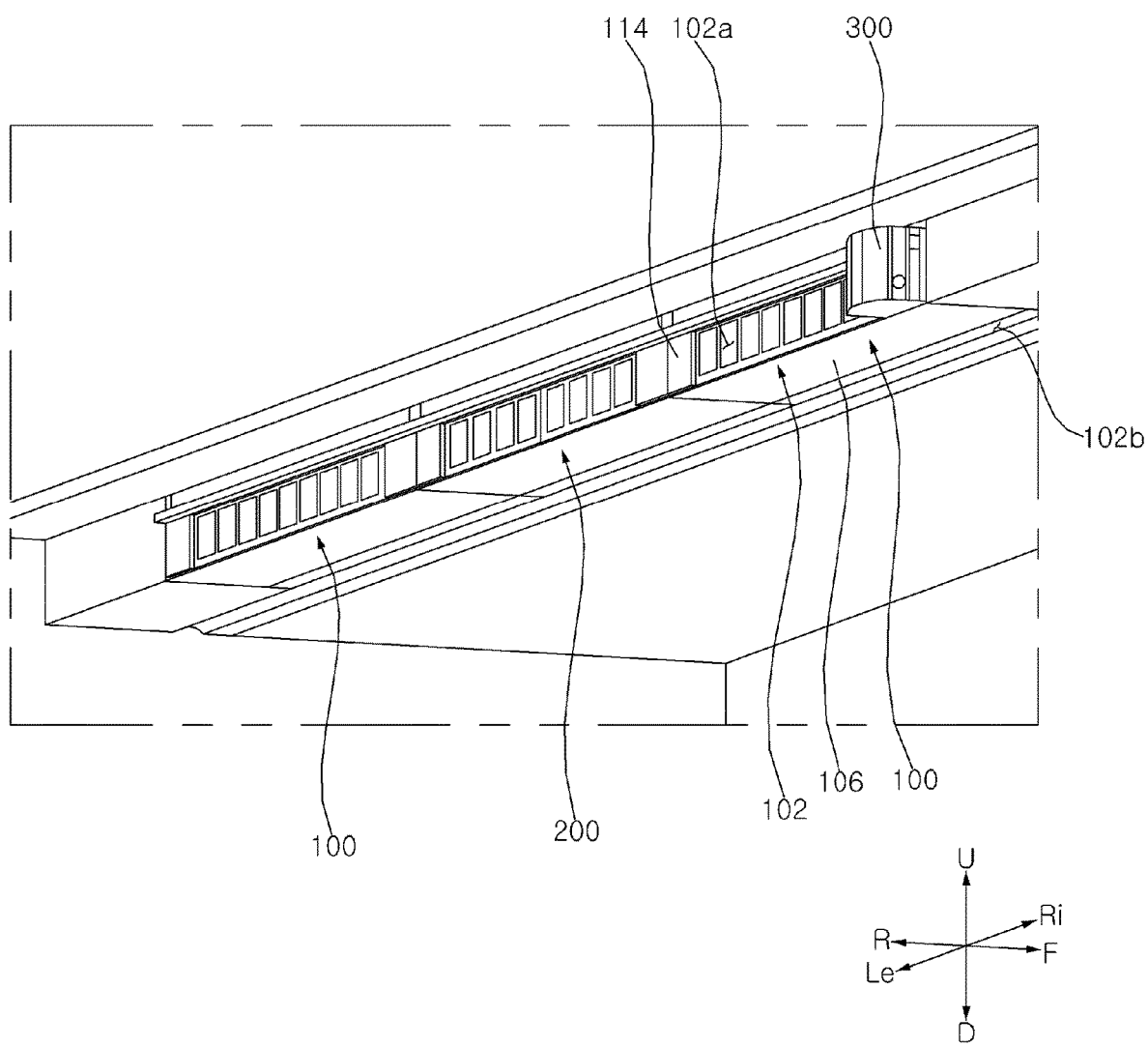
FIG. 1 is a perspective view of a first air-processing apparatus, a second air-processing apparatus, and a filter cleaner according to an embodiment.

Advantages and features embodiments and methods for achieving them will be made clear from embodiments described below with reference to the accompanying drawings. The embodiments may, however, be embodied in many different forms, and should not be construed as being limited to the embodiments set forth herein. Rather, these embodiments are provided so that this disclosure will be thorough and complete, and will fully convey the scope of the disclosure to those skilled in the art. The embodiments are defined only by the scope of the claims. Throughout the specification, the same or like reference numerals represent the same or like components.

Hereinafter, a filter cleaner and an air-processing apparatus including a filter cleaner according to embodiments will be described with reference to the accompanying drawings.

A filter cleaner 300 according to embodiments may clean a pre-filter 188 disposed in a case of an air-processing apparatus that adjusts a temperature of air or an air-processing apparatus that purifies air. The air-processing apparatus may include a first air-processing apparatus 100 that adjusts a temperature of air to be discharged and a second air-processing apparatus 200 that removes foreign substances from the air to be discharged. Hereinafter, embodiments will be described with reference to the first air-processing apparatus 100 (hereinafter referred to as an "air-processing apparatus"). The following description of the configuration of the air-processing apparatus 100 may also apply to the second air-processing apparatus 200.

The air-processing apparatus 100 may include a case 102, which defines the external appearance of the air-processing apparatus 100 and has an inlet 102a formed in one or a first side thereof, a filter 188, which is disposed in the inlet 102a, a guide rail 10, which is disposed on the case 102 at a position above the inlet 102a, and filter cleaner 300, which moves along the guide rail 10 to remove foreign substances from the filter 188.

A fan (not shown) that creates an air flow may be disposed inside of the case 102. The case 102 may include a rear cover 114, in which the inlet 102a is formed, and a lower cover 106, which is disposed perpendicular to the rear cover 114 and in which an outlet 102b is formed. The case 102 may further include an upper cover (not shown), which is disposed above the lower cover 106 so as to be spaced apart therefrom, and a front cover (not shown), which is disposed in front of the rear cover 114 so as to be spaced apart therefrom.

Referring to FIG. 1, the inlet 102a may be formed in the rear cover 114 in a leftward-rightward or lateral direction. The filter 188 may be disposed in the rear cover 114 in the lateral direction, in which the inlet 102a is formed.

Referring to FIG. 1, the inlet 102a may be formed in the case 102 so as to be open in a rearward direction, which is perpendicular to a downward direction toward the floor, and the outlet 102b may be formed in the case 102 at a position ahead of the inlet 102a in an air flow direction so as to be open in the downward direction.

The guide rail 10, along which the filter cleaner 300 moves, may be mounted on the rear cover 114. The rear cover 114 may be provided with a rail-fixing protrusion 117 that fixes one or a first side of the guide rail 10. The rail-fixing protrusion 117 may protrude from the rear cover 114 in a rearward direction.

The filter cleaner 300 may move along the rear cover 114 of the air-processing apparatus 100.

Figure 2:
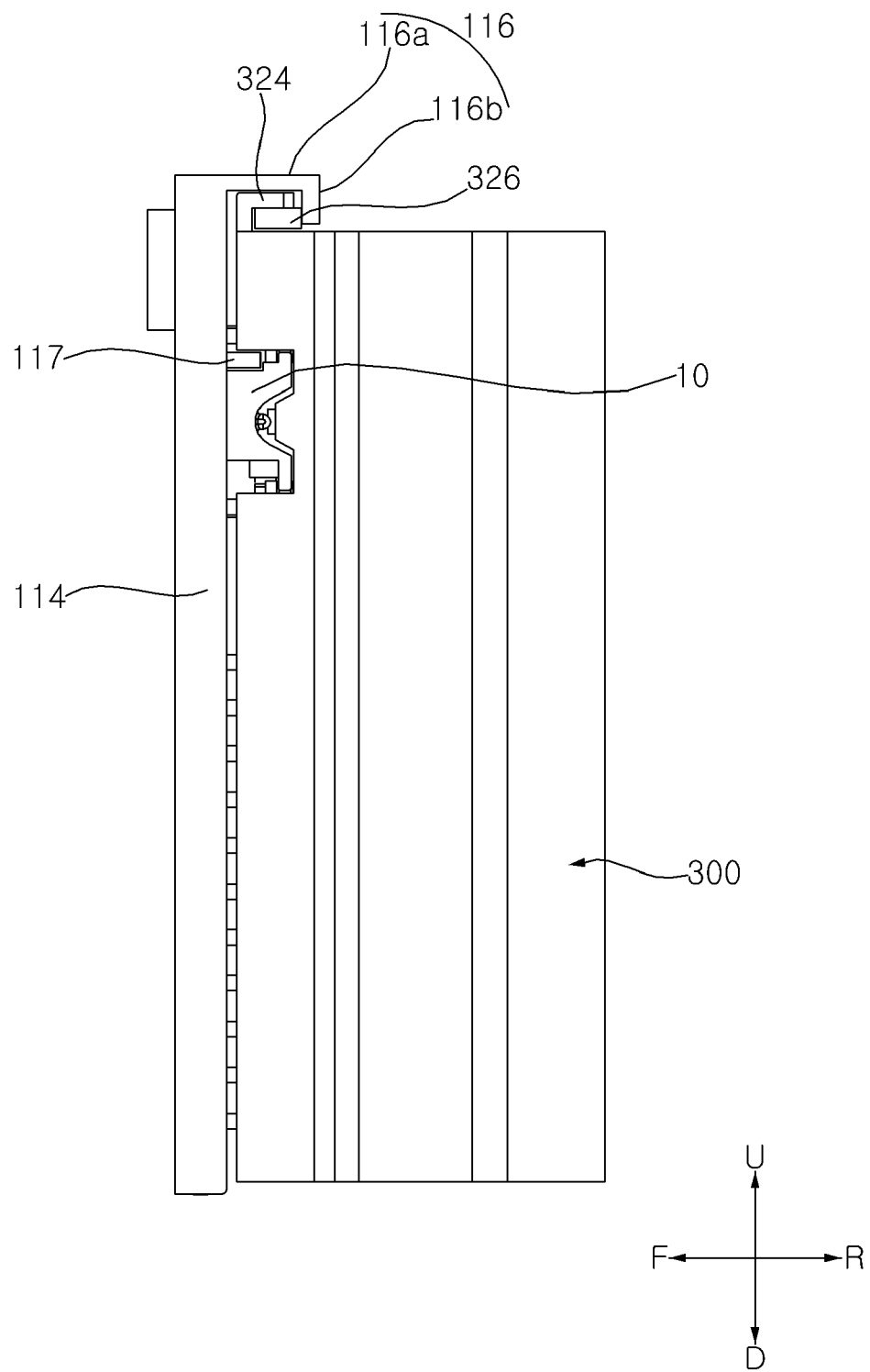
FIG. 2 is a side view showing one side of the filter cleaner disposed on a rear side of a case of the first air-processing apparatus or the second air-processing apparatus according to an embodiment.
Figure 3:
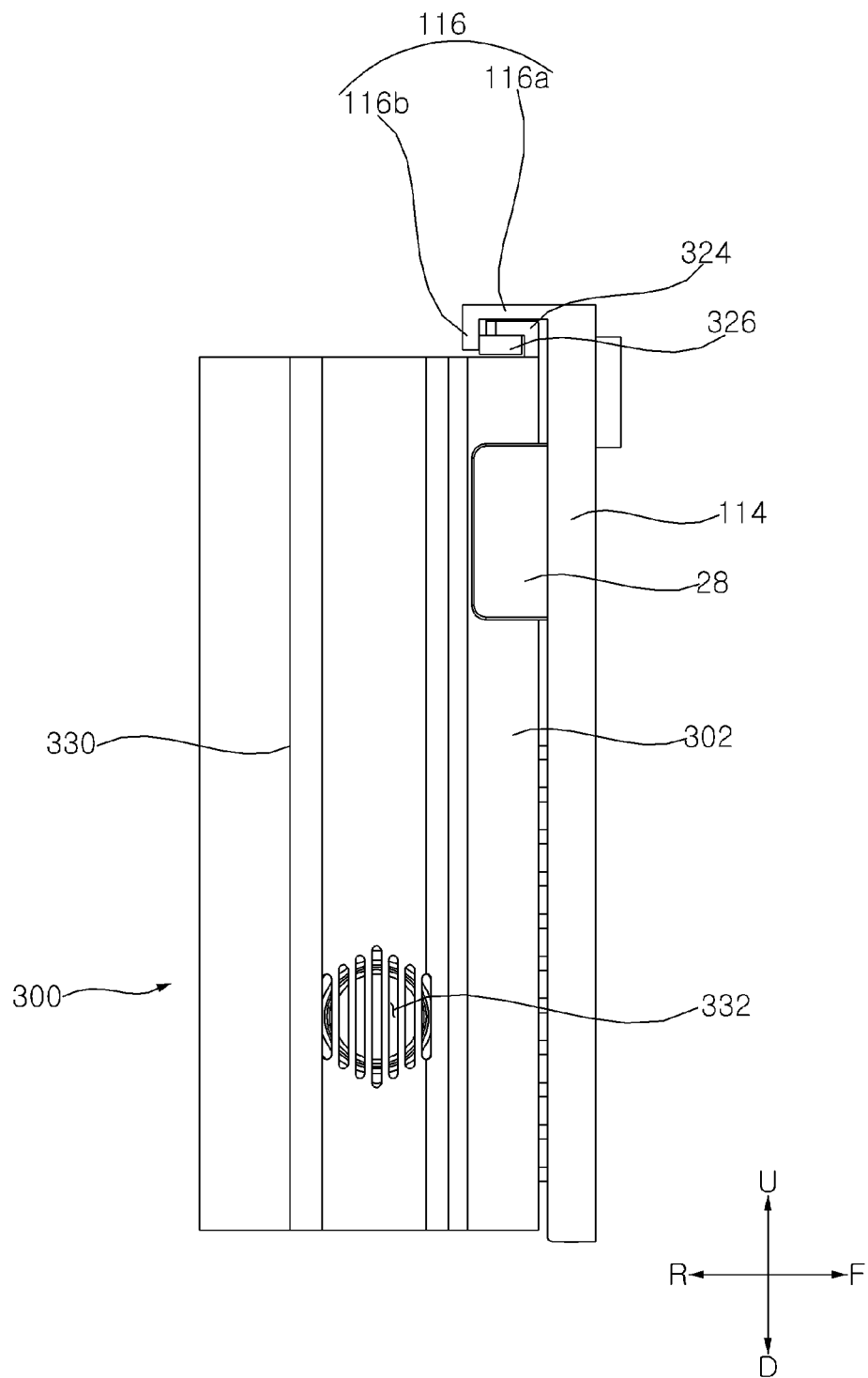
FIG. 3 is a side view showing an opposite side of the filter cleaner shown in FIG. 2.

Referring to FIG. 2, the guide rail 10 that guides the movement of the filter cleaner 300 may be disposed on the rear cover 114. A support rail 116 that supports the movement of the filter cleaner 300 may be disposed at an upper end of the rear cover 114. The guide rail 10 may be formed integrally with the rear cover 114.

The support rail 116 may include a top plate 116a, which protrudes rearwards from an upper end of the rear cover 114, and a bent portion 116b, which is bent and extends downwards from a rear end of the top plate 116a. A support roller 326 of the filter cleaner 300, which will be described hereinafter, may be disposed so as to be in contact with an inner surface of the bent portion 116b.

The guide rail 10 may be disposed on a rear side of the rear cover 114. The guide rail 10 may be disposed above the inlet 102a in the rear cover 114. The guide rail 10 may have a structure that extends in the lateral direction on the rear side of the rear cover 114. The guide rail 10 may be fixedly disposed below the rail-fixing protrusion 117.

Figure 4:
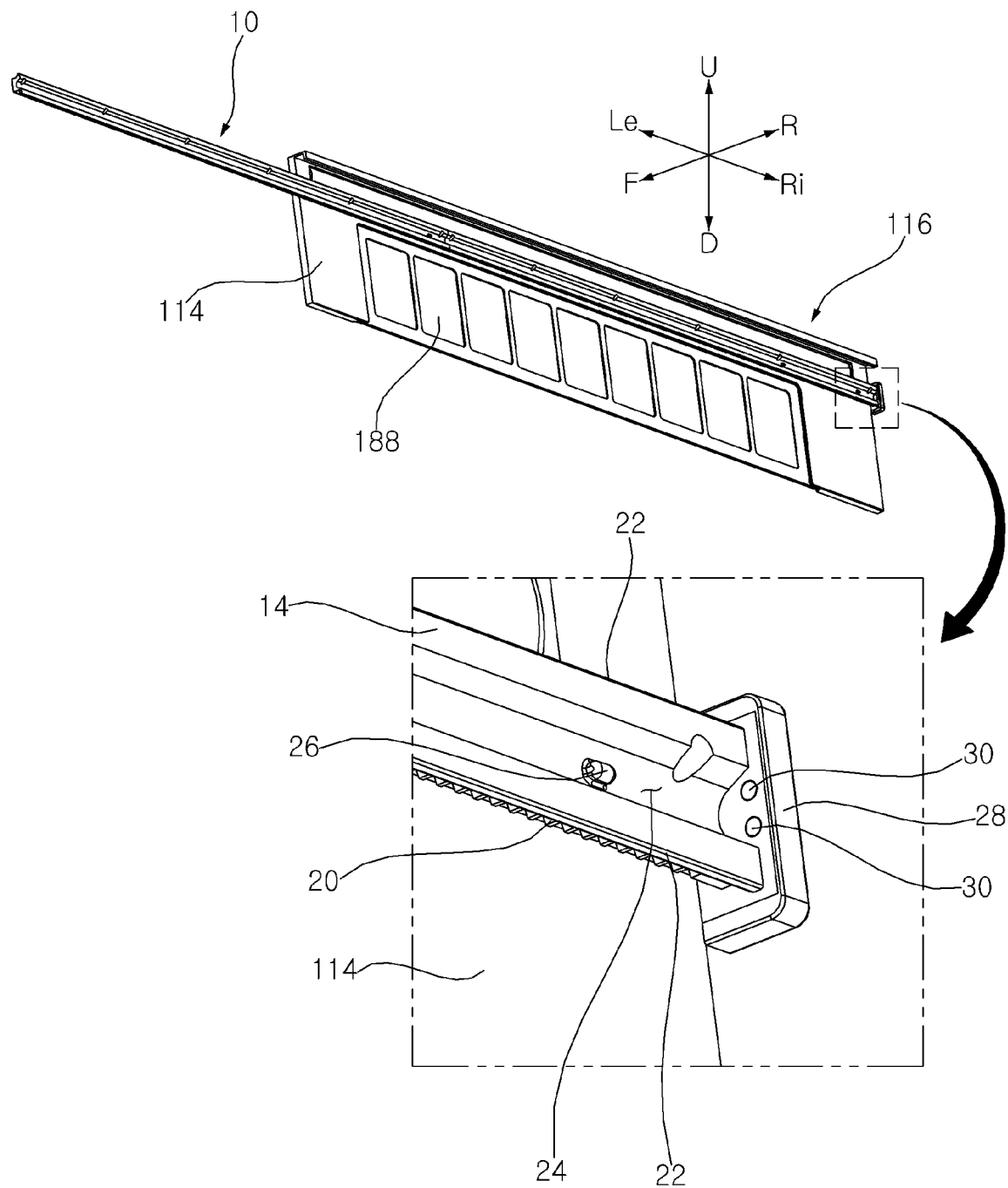
FIG. 4 is a perspective view of a rear cover and a guide rail disposed on a rear side of the rear cover according to an embodiment.
Figure 5:
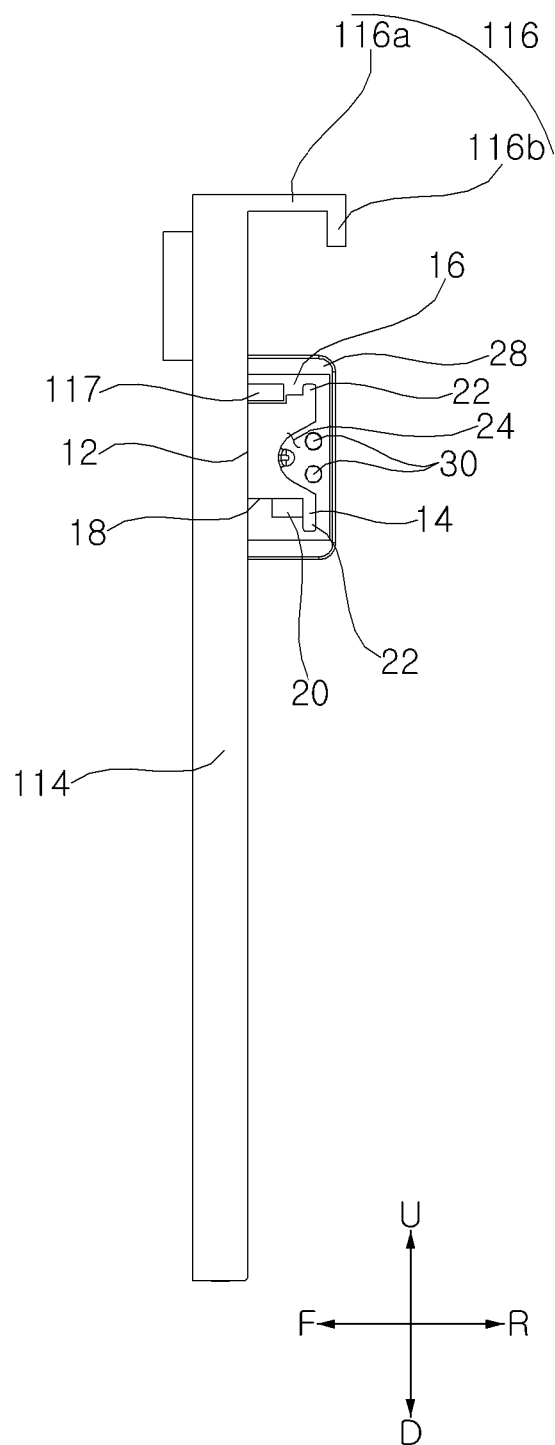
FIG. 5 is a side view of the rear cover and the guide rail of FIG. 4.

Referring to FIG. 4, the guide rail 10 may include a gear rail 20, which has threads to be engaged with a moving gear 358 of the filter cleaner 300, and a roller rail 22, which is in contact with guide rollers 308a and 308b of the filter cleaner 300. Referring to FIG. 5, the roller rail 22 may be disposed at each of the upper and lower ends of the rear surface 14 of the guide rail 10. The roller rail 22 may be disposed behind the gear rail 20. The roller rail 22 may be disposed at each of an upper side and a lower side of the guide rail 10. The roller rail 22 may have a rib structure that protrudes from a rear end of the guide rail 10 in an upward-downward direction. The roller rail 22 may be formed so as to protrude downwards further than the threads of the gear rail 20.

The gear rail 20 may be disposed in front of the roller rail 22. The gear rail 20 may be is disposed on the lower surface 18 of the guide rail 10. The gear rail 20 may be formed on a lower surface of the guide rail 10. The gear rail 20 may have a shape of a rack gear. In addition, the moving gear 358, which is engaged with the gear rail 20, may have a shape of a pinion gear. When viewed from the rear, the guide rail 10 may have a structure in which the gear rail 20 is shielded by the roller rail 22.

Referring to FIG. 5, front surface 12 of the guide rail 10, which faces the rear cover 114, and upper surface 16 of the guide rail 10, which faces the rail-fixing protrusion 117, may be in contact with the rear cover 114. A rail groove 24 may be formed in rear surface 14 of the guide rail 10.

Figure 6:
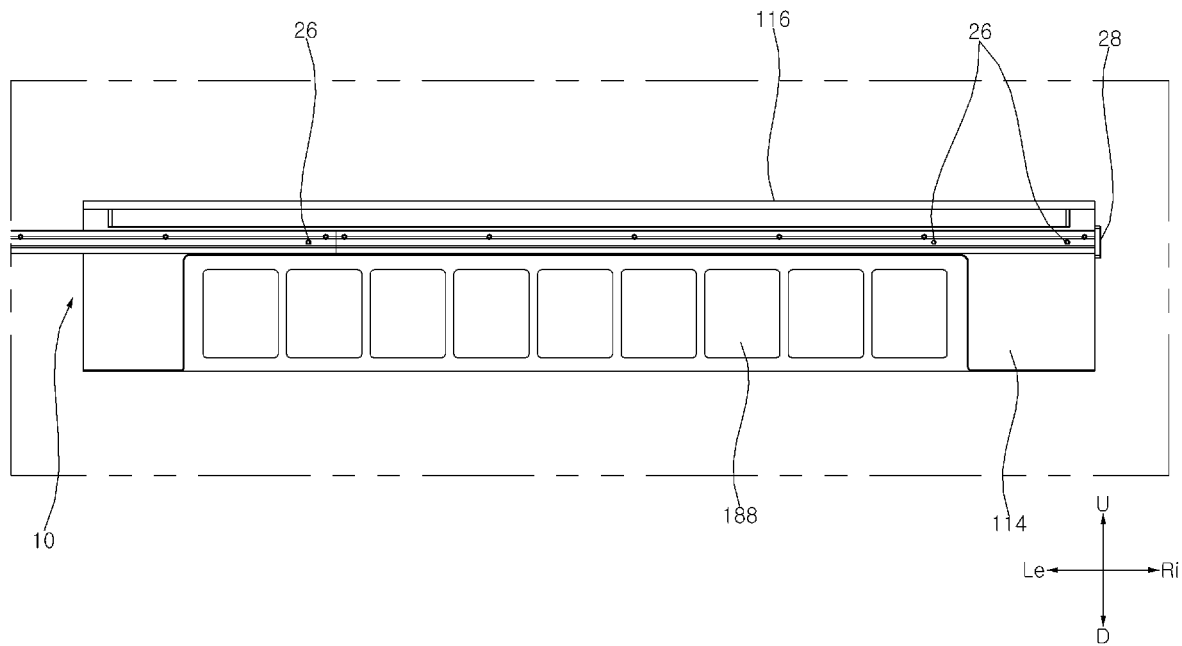
FIG. 6 is a rear view of the rear cover and the guide rail of FIG. 4.

The rail groove 24 may have a shape that is recessed in the forward direction, and extend in the lateral direction. An object to be sensed 26 may be disposed in the rail groove 24. Referring to FIG. 6, a plurality of the object to be sensed 26 may be provided, and the plurality of objects to be sensed 26 may be spaced apart from each other in the lateral direction. A position detection sensor 322 may be disposed at the filter cleaner 300, and when the position detection sensor 322 senses the object to be sensed 26, a position of the filter cleaner 300 may be detected.

The object to be sensed 26 may be formed in a structure corresponding to the position detection sensor 322. For example, when the position detection sensor 322 is a switch sensor, the object to be sensed 26 may have a shape of a protrusion that protrudes rearwards. Alternatively, when the position detection sensor 322 is a Hall sensor, the object to be sensed 26 may be implemented as a magnet.

Referring to FIGS. 4 to 6, an end plate 28 configured to limit movement of the filter cleaner 300 in one direction may be disposed at a lateral end, for example, a left end or a right end of the guide rail 10. The end plate 28 may be disposed in a direction perpendicular to the direction in which the guide rail 10 extends. The end plate 28 may protrude rearwards from the rear cover 114.

The end plate 28 may be provided with a charging terminal 30, with which a connection terminal 320 of the filter cleaner 300 may be brought into contact. The charging terminal 30 may protrude from the end plate 28 in the direction in which the guide rail 10 extends. Accordingly, when the filter cleaner 300 reaches the end plate 28, the connection terminal 320 of the filter cleaner 300 may be brought into contact with and connected to the charging terminal 30.

The filter cleaner 300 may be disposed at a rear side of the air-processing apparatus 100 so as to be movable in the lateral direction. The filter cleaner 300 may move in the lateral direction along the guide rail 10 disposed on the rear cover 114. The filter cleaner 300 may remove foreign substances adhered to the pre-filter 188.

Figure 11:
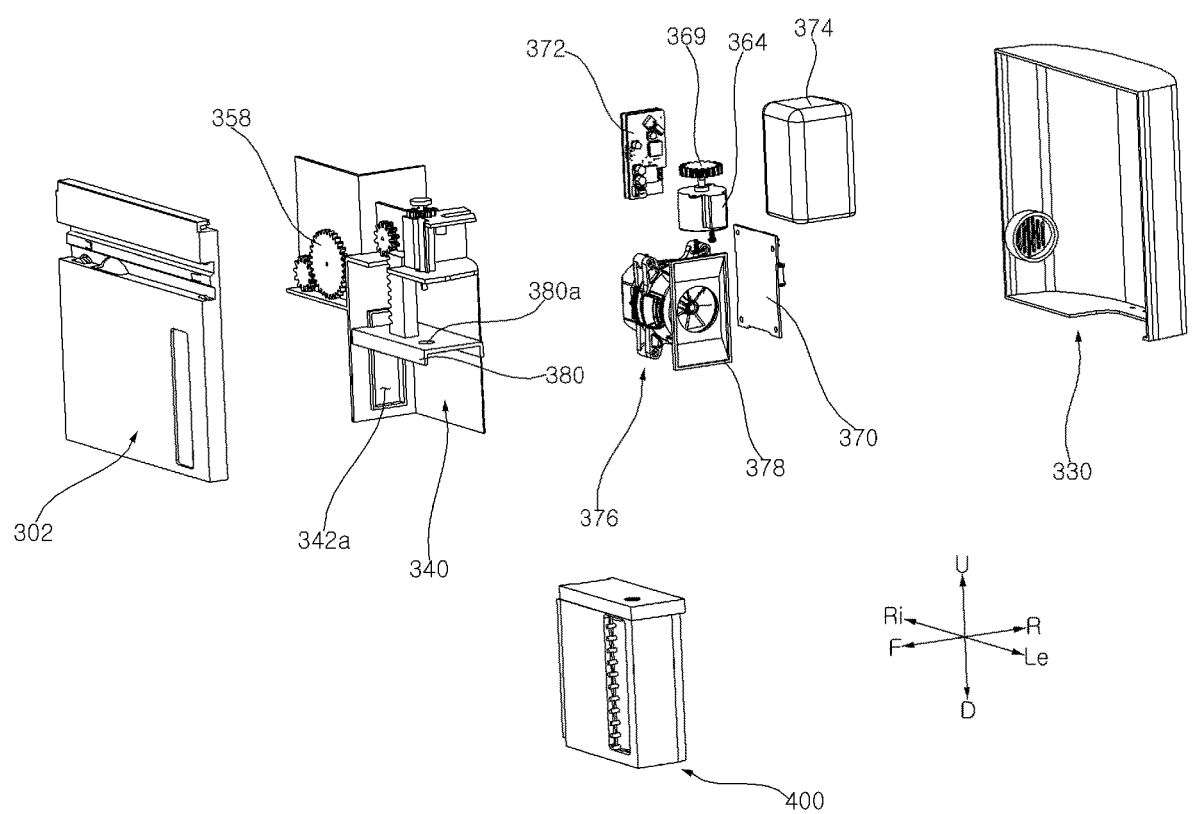
FIG. 11 is an exploded perspective view of the filter cleaner of FIG. 7.
Figure 12:
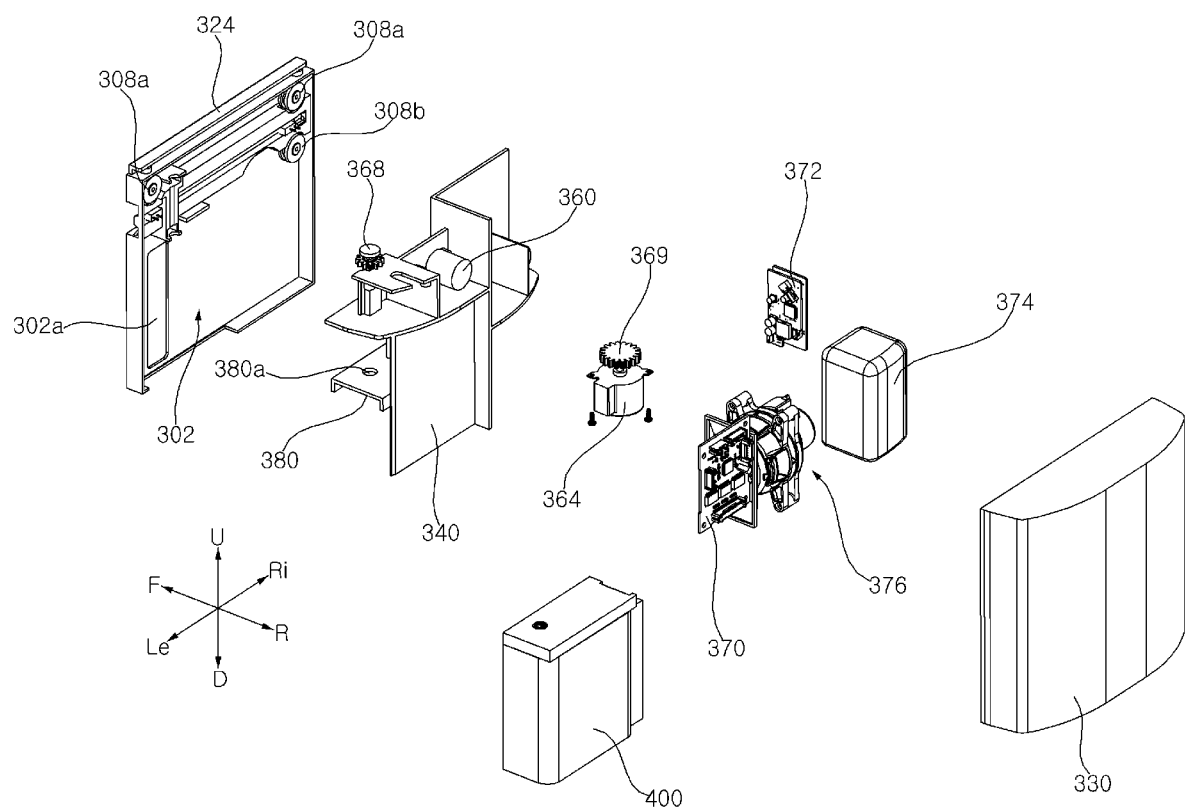
FIG. 12 is an exploded perspective view of the filter cleaner of FIG. 7, when viewed from a direction different from that of FIG. 11.

Referring to FIGS. 11 and 12, the filter cleaner 300 may include housings 302 and 330, which define the external appearance of the filter cleaner 300, moving gear 358, which is rotatably disposed inside of the housings 302 and 330 in order to move the housings 302 and 330, a gear motor 356, which is disposed inside of the housings 302 and 330 in order to rotate the moving gear 358, guide rollers 308a and 308b, which are rotatably disposed inside of the housings 302 and 330 in order to guide the movement of the housings 302 and 330, a dust container 400, which receives foreign substances removed from the pre-filter 188, and a suctioner 376, which forms a flow of air to the dust container 400.

The dust container 400 may include a dust container housing 402 and an agitator 420 (refer to FIG. 19), which removes foreign substances from the pre-filter 188 by contacting the same. The dust container 400 will be described hereinafter.

Referring to FIGS. 11 and 12, the filter cleaner 300 may include a partition wall 340, which is disposed inside of the housings 302 and 330 in order to partition an inner space in the housings 302 and 330, and a dust container guide 380, which is movably disposed on the partition wall 340 in order to displace the dust container 400.

Referring to FIGS. 11 and 12, the housings 302 and 330 define the external appearance of the filter cleaner 300. The housings 302 and 330 may include first housing 302, which is disposed so as to face the rear cover 114 when the filter cleaner 300 is mounted to the guide rail 10, and second housing 330, which is disposed at a rear side of the first housing 302 in order to cover the same. An outlet 332 through which air is discharged by the suctioner 376 is formed on one side of the second housing 300.

Figure 7:
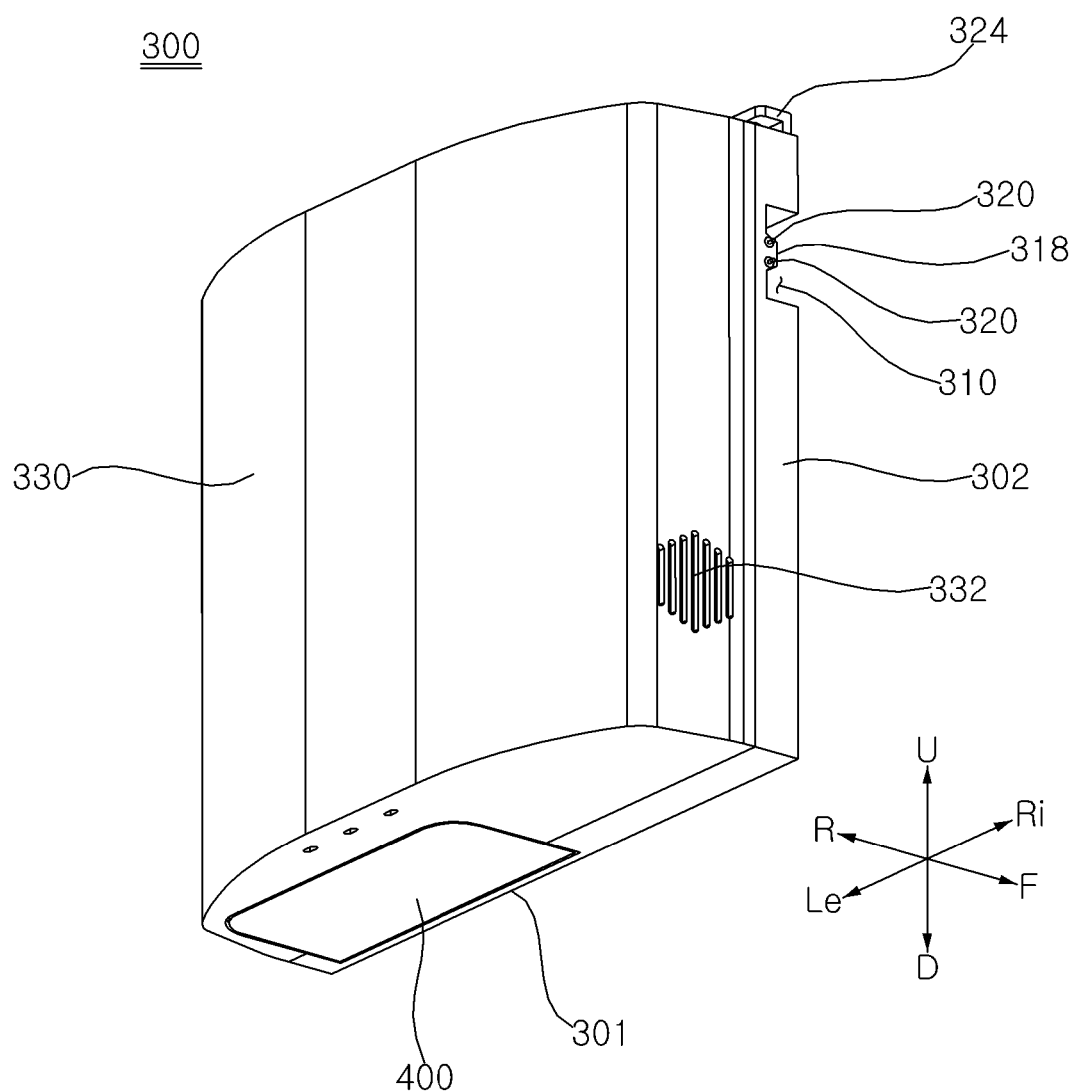
FIG. 7 is a perspective view of the filter cleaner according to an embodiment.

Referring to FIG. 7, the housings 302 and 330 may have a dust container hole 301 formed in lower surfaces thereof to allow the dust container 400 to be withdrawn therefrom or inserted thereinto.

The first housing 302 may have a shape of a plate that extends parallel to the pre-filter 188. When the filter cleaner 300 moves in a region behind the pre-filter 188, the first housing 302 may be maintained at a constant interval behind the pre-filter 188.

Figure 13:
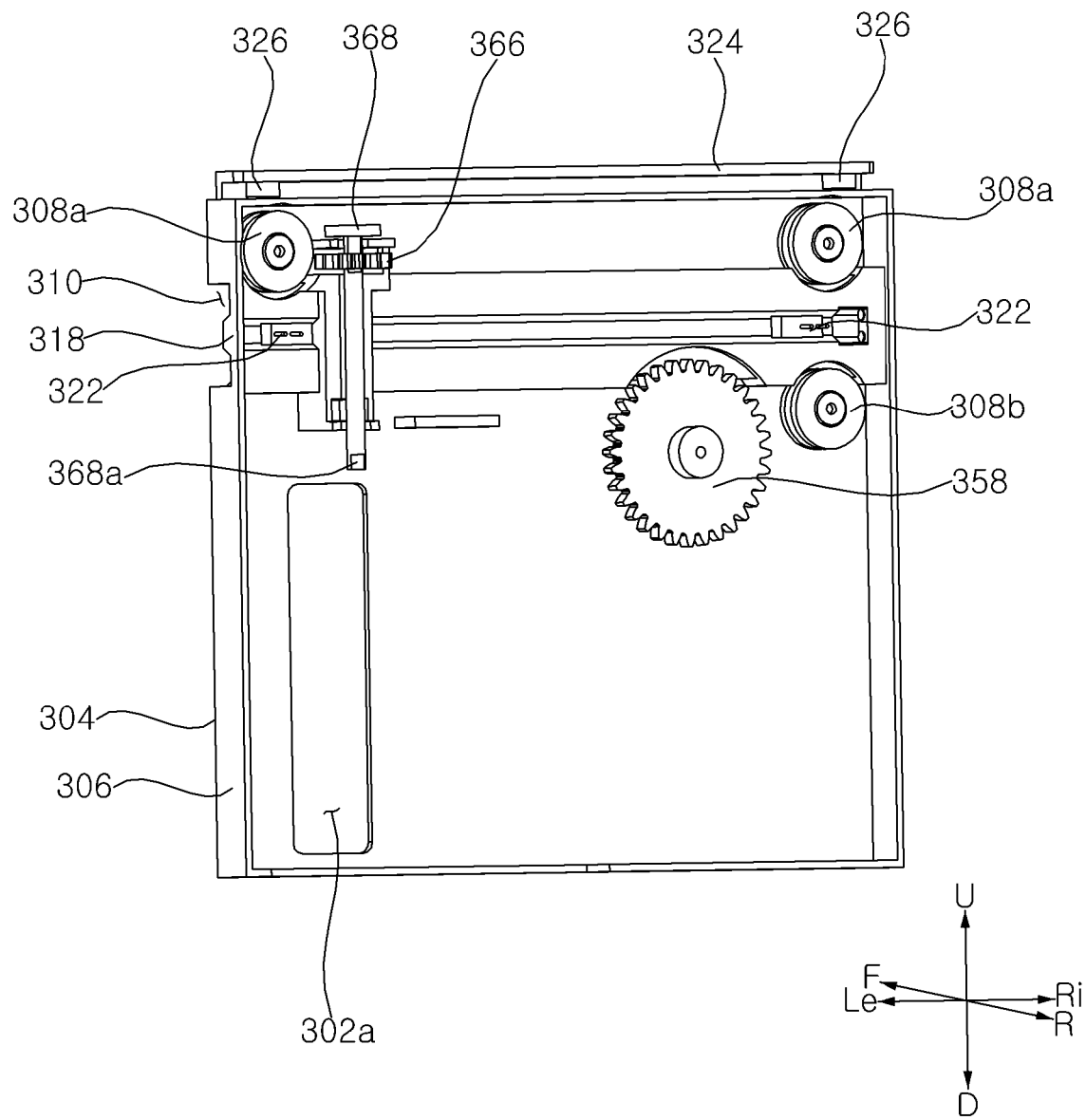
FIG. 13 is a perspective view of a first housing and components disposed inside of the first housing according to an embodiment.
Figure 14:
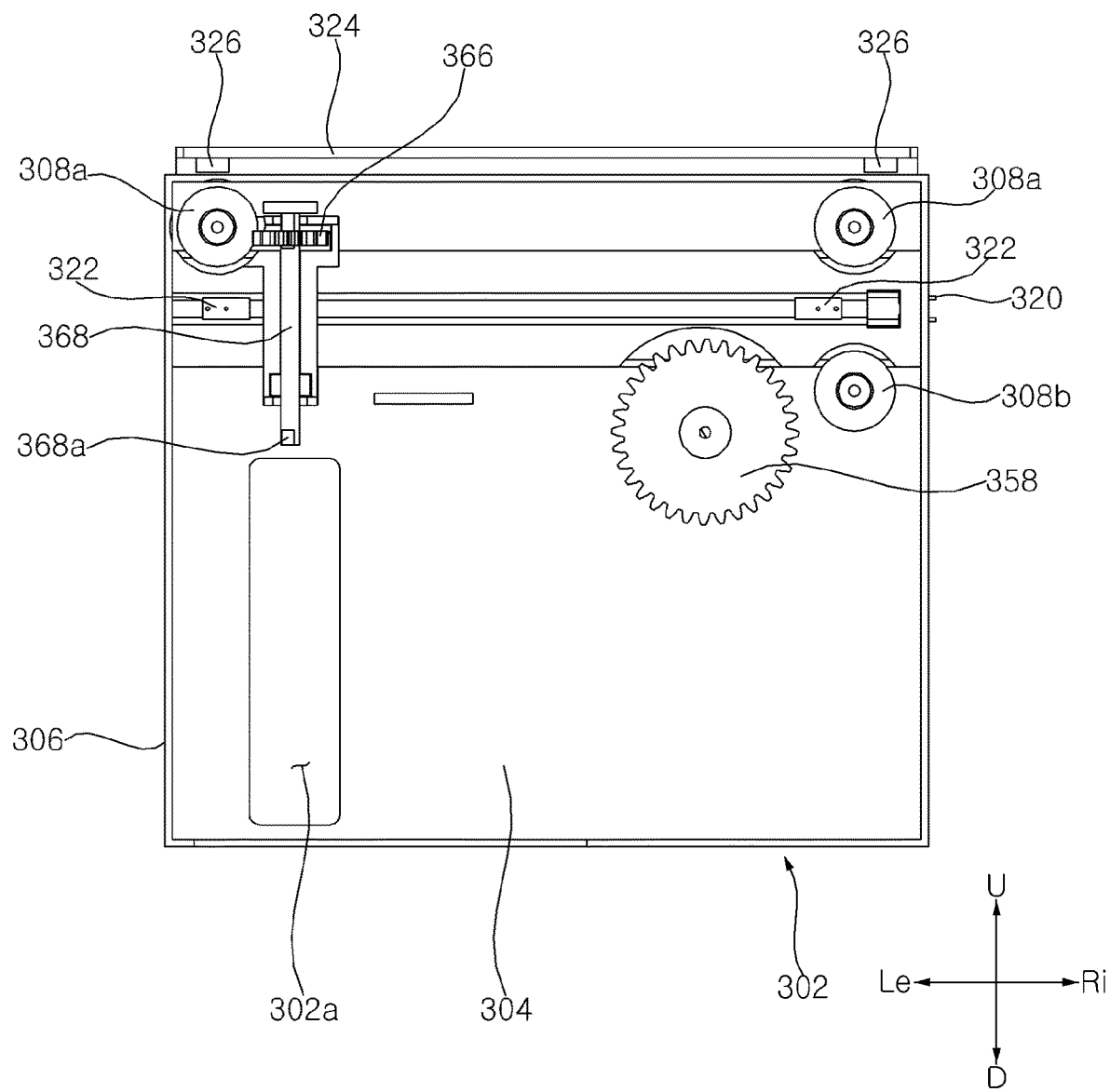
FIG. 14 is a rear view of the first housing of FIG. 13.

Referring to FIG. 13, the first housing 302 may include a base plate 304, which has a shape of a plate that extends parallel to the pre-filter 188, and a guide groove 310, which is formed in the base plate 304 so as to be recessed rearwards in order to provide a space in which the guide rail 10 may be disposed.

Referring to FIG. 13, the base plate 304 may have a suction hole 302a formed therein to introduce foreign substances into the dust container 400 therethrough. The agitator 420 may have disposed at a position corresponding to the suction hole 302a. The suction hole 302a may be formed to have a size corresponding to a size of the pre-filter 188 disposed on the rear cover 114. That is, a height of the suction hole 302a in the upward-downward direction may be set to correspond to a height of the pre-filter 188 in the upward-downward direction.

Figure 15:
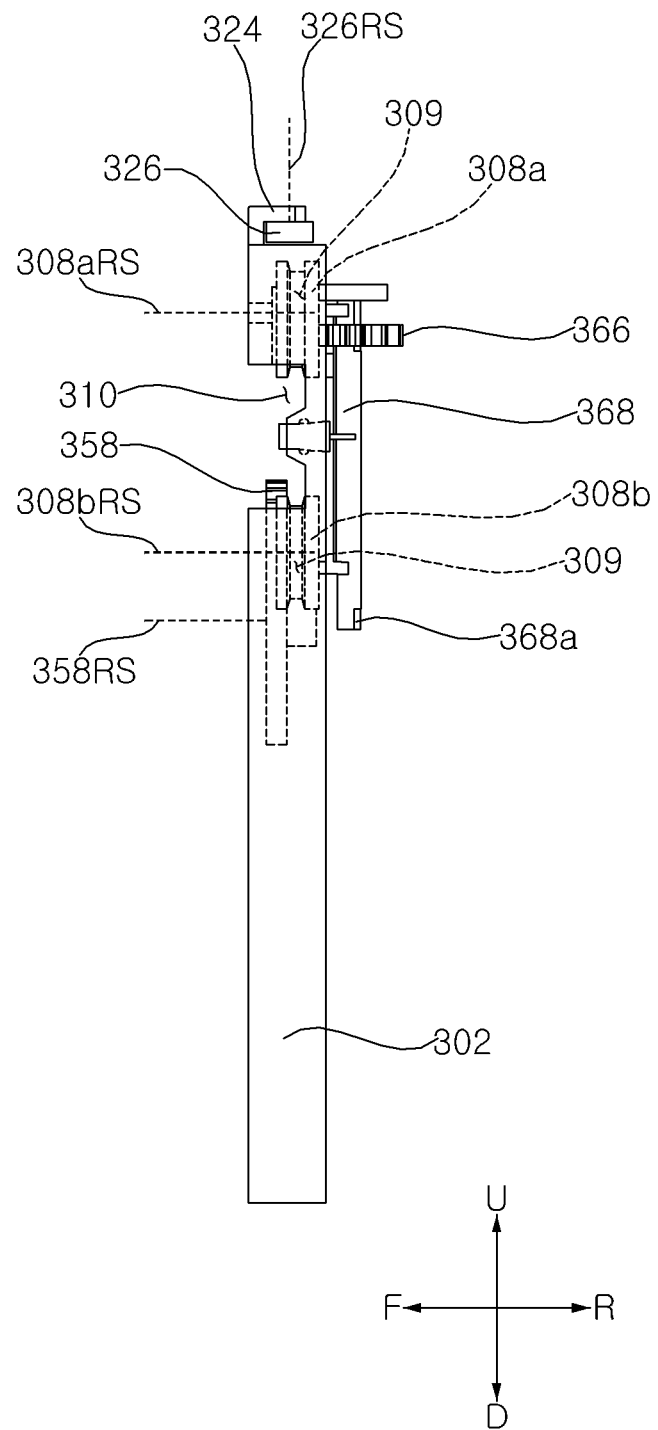
FIG. 15 is a side view of the first housing of FIG. 13.

Referring to FIG. 15, the first housing 302 may include a peripheral wall 306, which extends rearwards from a periphery of the base plate 304, and a top wall 324, which is bent and extends rearwards from an upper end of the base plate 304. The top wall 324 may be spaced upwards apart from the peripheral wall 306. A support roller 326, which is in contact with the support rail 116 of the rear cover 114, may be disposed on the top wall 324.

Referring to FIG. 15, the support roller 326 may rotate about a rotational axis 326RS extending in the upward-downward direction. The rotational axis 326RS of the support roller 326 may extend perpendicular to the rotational axes 308aRS and 308bRS of the guide rollers 308a and 308b. The rotational axis 326RS of the support roller 326 may extend perpendicular to rotational axis 358RS of the moving gear 358. The support roller 326 may be in contact with the bent portion 116b of the support rail 116, thereby supporting displacement of the filter cleaner 300.

Figure 9:
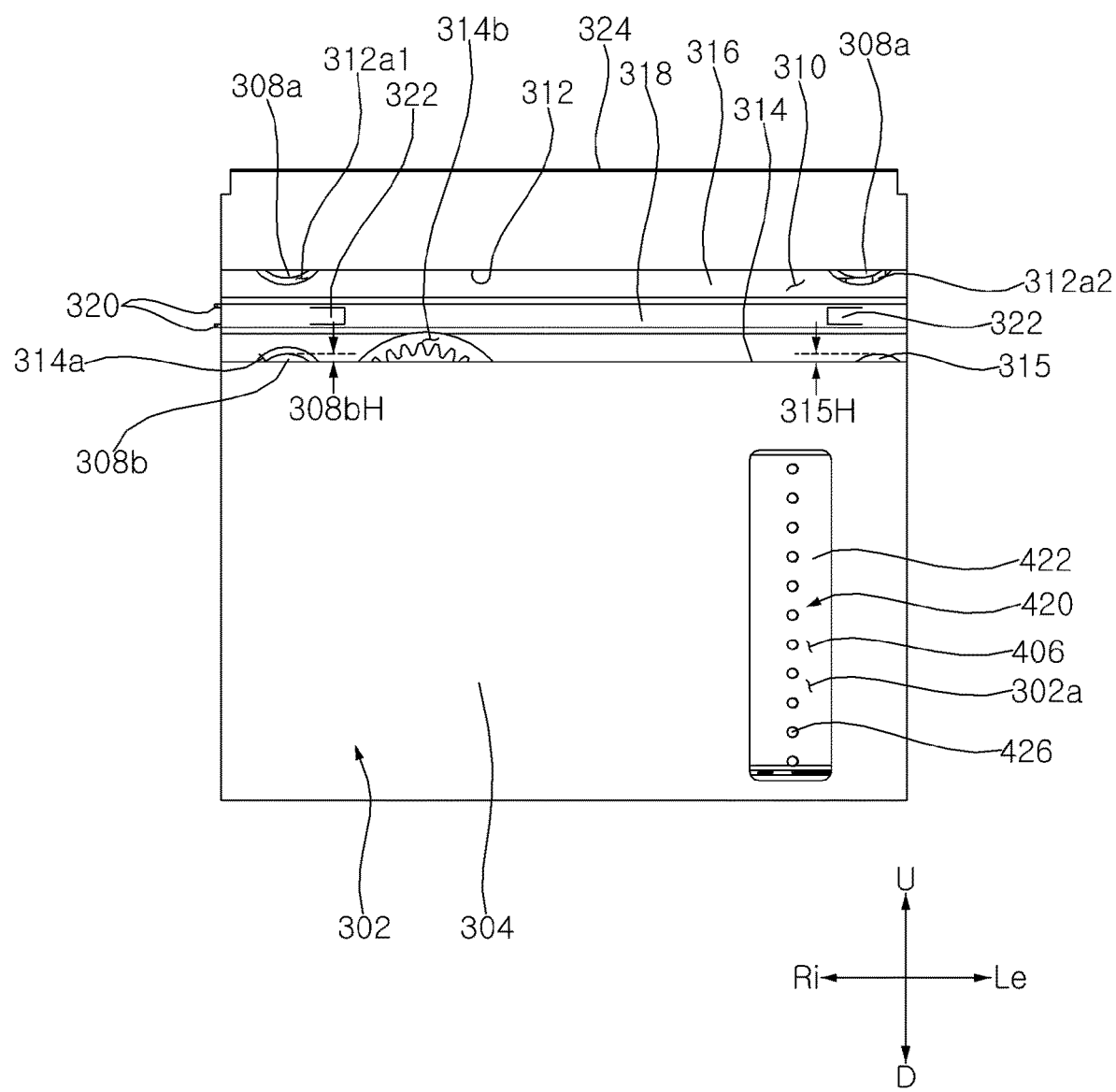
FIG. 9 is a front view of the filter cleaner of FIG. 7.
Figure 10:
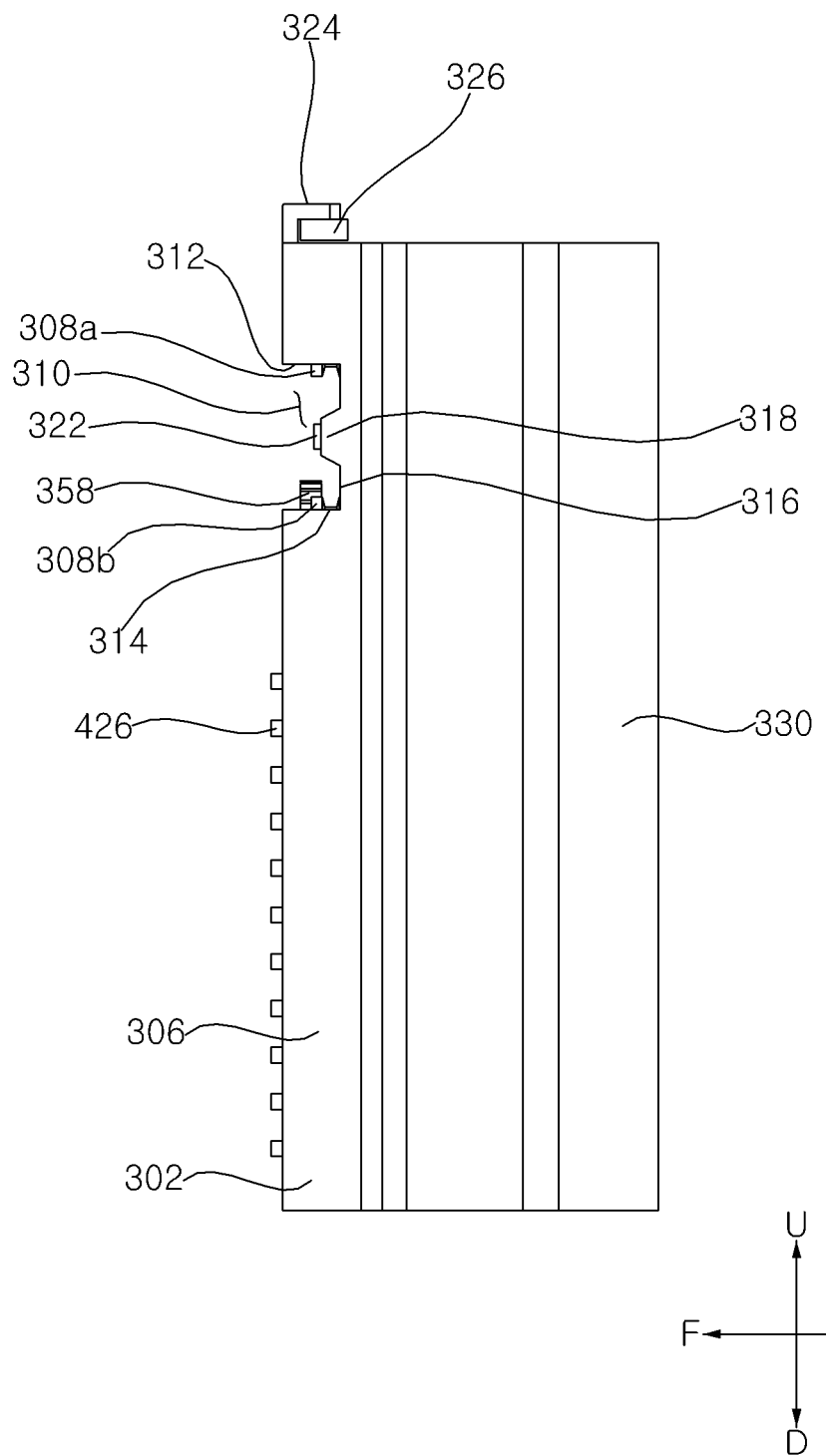
FIG. 10 is a side view of the filter cleaner of 'FIG. 7.

Referring to FIGS. 9 and 10, the guide groove 310 may be defined by an upper wall 312, a lower wall 314, and an inner wall 316. The upper wall 312 may cover an upper portion of the guide groove 310. The upper wall 312 has therein upper roller holes 312a1 and 312a2, through which portions of the guide rollers 308a may pass. According to one embodiment, two upper roller holes 312a1 and 312a2 may be disposed in the upper wall 312 so as to be spaced apart from each other in the lateral direction.

The upper roller holes 312a1 and 312a2 may include first upper roller hole 312a1 and second upper roller hole 312a2, which may be spaced apart from the first upper roller hole 312a1 in the lateral direction. Referring to FIG. 9, the first upper roller hole 312a1 may be disposed above a lower roller hole 314a, and the second upper roller hole 312a2 is disposed above a support protrusion 315.

The lower wall 314 may cover a lower portion of the guide groove 310. The lower wall 314 may have therein the lower roller hole 314a, through which a portion of the guide roller 308b may pass, and gear hole 314b, through which a portion of the moving gear 358 may pass. The lower wall 314 may be provided with the support protrusion 315 which protrudes upwards toward the guide rail 10.

Referring to FIG. 9, the support protrusion 315 may be spaced apart from the lower roller hole 314a in the lateral direction. The support protrusion 315 may be disposed above the dust container 400. The gear hole 314b may be formed between the support protrusion 315 and the lower roller hole 314a. Referring to FIG. 9, a height 315H by which the support protrusion 315 protrudes upwards from the lower wall 314 may be lower than a height 308bH by which the guide roller 308b protrudes from the lower wall 314. The inner wall 316 interconnects a rear end of the lower wall 314 and a rear end of the upper wall 312.

Referring to FIG. 10, the inner wall 316 is provided with a protruding portion 318 that protrudes forward. The protruding portion 318 may extend in the lateral direction along the inner wall 316. The position detection sensor 322 may be disposed on the protruding portion 318 in order to detect the position of the filter cleaner 300. The position detection sensor 322 may be implemented as, for example, a switch sensor or a Hall sensor. The position detection sensor 322 may react with the object to be sensed 26 disposed on the guide rail 10, thereby detecting the position of the filter cleaner 300.

Figure 8:
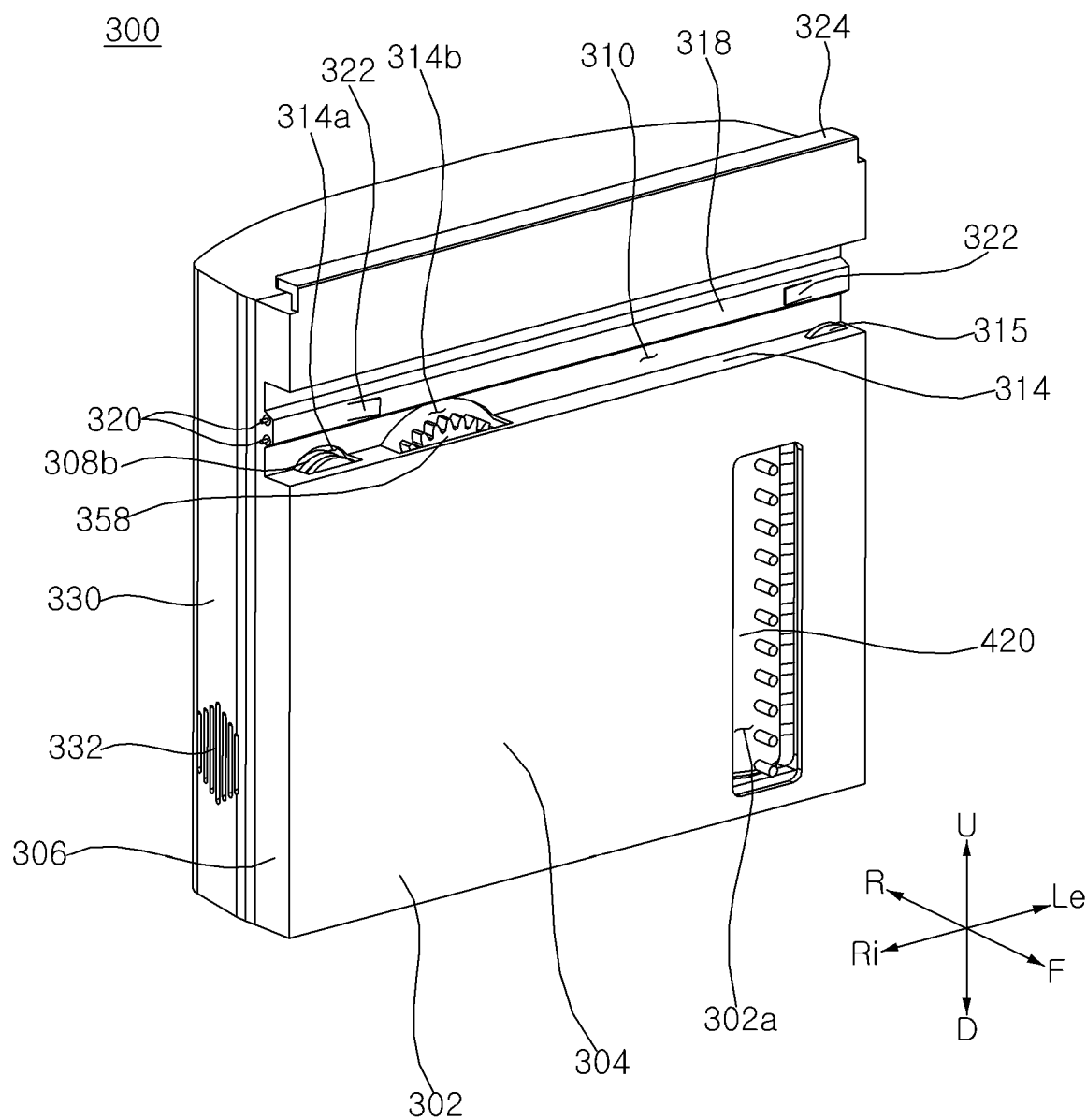
FIG. 8 is a perspective view of the filter cleaner when viewed from a direction different from that of FIG. 7.

Referring to FIG. 8, the connection terminal 320 may protrude from one lateral end of the protruding portion 318. The connection terminal 320 may protrude toward the end plate 28. When the connection terminal 320 is brought into contact with the charging terminal 30 of the end plate 28, power may be supplied to a battery 374 disposed inside of the housings 302 and 330.

Referring to FIG. 9, the guide rollers 308a and 308b may be disposed in the first housing 302 so as to rotate while in contact with the roller rail 22 of the guide rail 10 and to guide the movement of the filter cleaner 300. The guide rollers 308a and 308b may be disposed in the guide groove 310 in the upward-downward direction. The guide rollers 308a and 308b may be disposed such that portions thereof protrude into the guide groove 310. The guide rollers 308a and 308b may be disposed inside of the first housing 302.

The guide rollers 308a and 308b may include upper rollers 308a disposed at an upper side of the guide groove 310 and a lower roller 308b disposed at a lower side of the guide groove 310. Referring to FIG. 15, each of the guide rollers 308a and 308b may include a groove 309 formed concavely in a circumferential surface thereof in the circumferential direction. The roller rail 22 of the guide rail 10 may be inserted into the groove 309 formed in each of the guide rollers 308a and 308b. As the roller rail 22 is inserted into the guide rollers 308a and 308b, the filter cleaner 300 may move stably.

Referring to FIG. 9, the filter cleaner 300 may includes two upper rollers 308a and one lower roller 308b. The two upper rollers 308a may be spaced apart from each other in the lateral direction. One of the two upper rollers 308a may be disposed above the lower roller 308b. The support protrusion 315 may be disposed below the other one of the two upper rollers 308a. Referring to FIG. 15, the rotational axes 308aRS and 308bRS of the guide rollers 308a and 308b may extend perpendicular to the rotational axis 326RS of the support roller 326.

The moving gear 358 may be rotatably disposed at a lower side of the guide groove 310. A portion of the moving gear 358 may be disposed in the guide groove 310 through the gear hole 314b formed in the lower wall 314. The moving gear 358 may be rotatably mounted in the first housing 302 or to the partition wall 340 described hereinafter.

Referring to FIG. 15, the moving gear 358 may be disposed at a position further forward than the guide rollers 308a and 308b. The rotational axis of the moving gear 358 may extend parallel to the rotational axes of the guide rollers 308a and 308b.

A space in which an agitator gear 366 and an agitator connection shaft 368, which will be described hereinafter, may be rotatably disposed may be formed in an inner surface of the first housing 302.

The partition wall 340 may be disposed between the first housing 302 and the second housing 330. The partition wall 340 may include a plurality of partition plates configured to partition an interior of the housings 302 and 330. The partition wall 340 may be disposed inside of the housings 302 and 330 to increase a rigidity of the housings 302 and 330.

Figure 16:
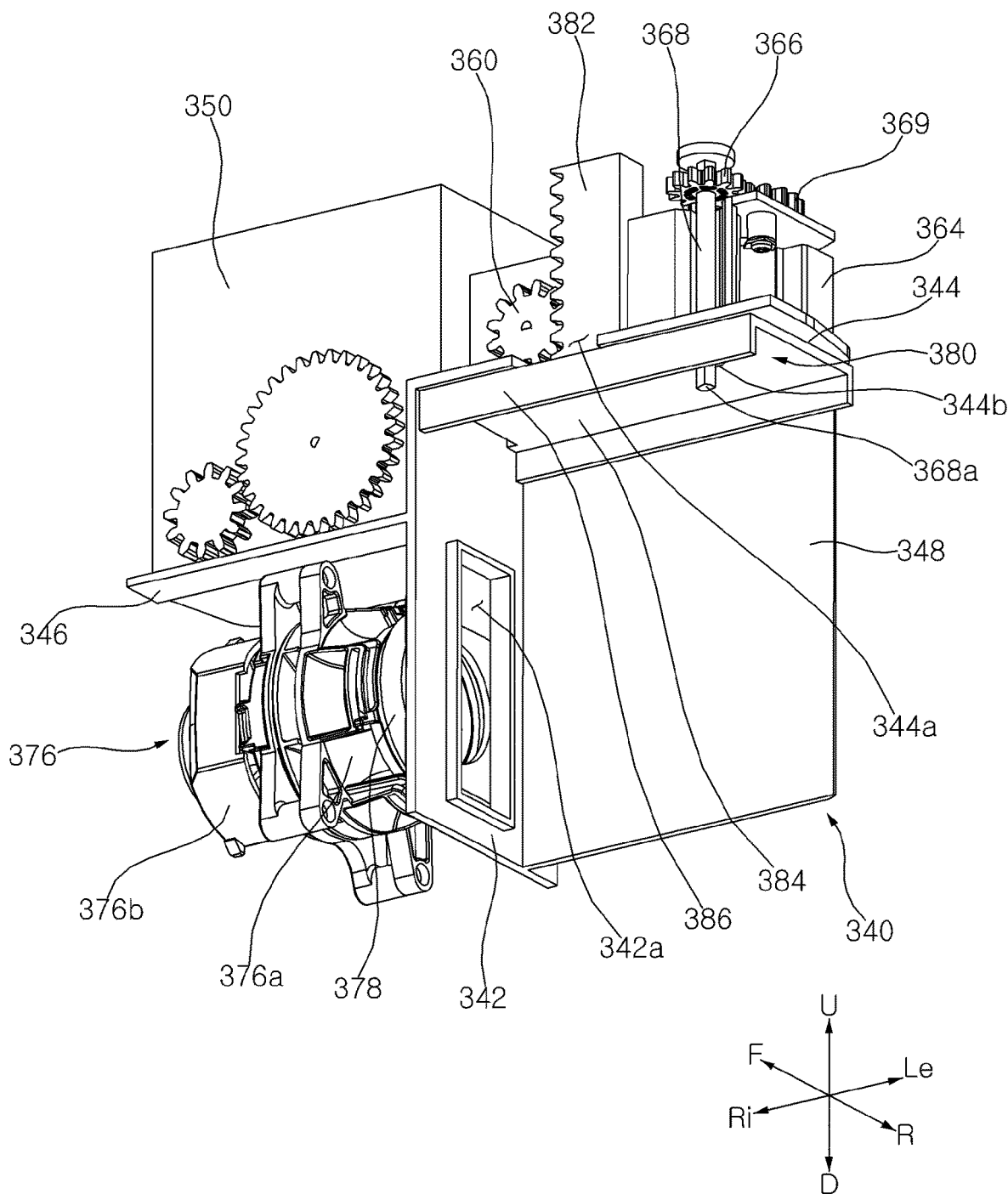
FIG. 16 is a perspective view of partition plates and components disposed on the partition plates according to an embodiment.

Referring to FIG. 16, the partition wall 340 may form a space in which the dust container 400 may be disposed. A dust container guide 380 that guides movement of the dust container 400 may be disposed on the partition wall 340. The dust container guide 380 may be displaced in the upward-downward direction by a dust container gear and a dust container motor 360, which may be disposed on the partition wall 340.

The partition wall 340 may isolate the space in which the dust container 400 is disposed from the space in which the suctioner 376 is disposed. The partition wall 340 may isolate the space in which the dust container 400 is disposed from the space in which a dust container gear 362 that displaces the dust container 400 is disposed. The partition wall 340 may isolate the space in which the dust container 400 is disposed from the space in which a first printed circuit board 370 is disposed. The partition wall 340 may isolate the space in which the battery 374 is disposed from the space in which the suctioner 376 is disposed. The partition wall 340 may isolate the space in which the battery 374 is disposed from the space in which the moving gear 358 is disposed. The partition wall 340 may isolate the space in which the dust container motor 360 is disposed from the space in which an agitator motor 364 is disposed.

That is, the partition wall 340 may partition the inner space in the housings 302 and 330 into a plurality of regions using a plurality of plates arranged perpendicular to or parallel to each other. More specifically, the partition wall 340 may include a vertical partition 342, which partitions the interior of the housings 302 and 330 in the lateral direction, horizontal partitions 344 and 346, which partition the interior of the housings 302 and 330 in the upward-downward direction, and forward-rearward partitions 348 and 350, which partition the interior of the housings 302 and 330 in the forward-rearward direction.

Referring to FIG. 16, the vertical partition 342 may isolate the space in which the suctioner 376 is disposed from the space in which the dust container 400 is disposed. The vertical partition 342 may extend in the upward-downward direction inside of the housings 302 and 330. The vertical partition 342 may isolate the space in which the battery 374 is disposed from the space in which the dust container 400 is disposed. The vertical partition 342 may isolate the space in which the battery 374 is disposed from the space in which the dust container gear 362 and the agitator gear 366 are disposed. The battery 374 may be disposed above the suctioner 376. The vertical partition 342 may have therein a communication hole 342a formed at a portion corresponding to the suctioner 376, through which the suctioner 376 and the dust container 400 may communicate with each other.

Referring to FIG. 16, the horizontal partitions 344 and 346 may include first horizontal partition 344, which may isolate the space in which the dust container 400 is disposed from the space in which the dust container gear 362 and the agitator gear 366 are disposed, and a second horizontal partition 346, which may isolate the space in which the suctioner 376 is disposed from the space in which the battery 374 is disposed.

The first horizontal partition 344 may have a shaft hole 344b formed therein to allow the agitator connection shaft 368 to pass therethrough. The first horizontal partition 344 may have a guide hole 344a formed therein to allow some components of the dust container guide 380 to pass therethrough.

Figure 17:
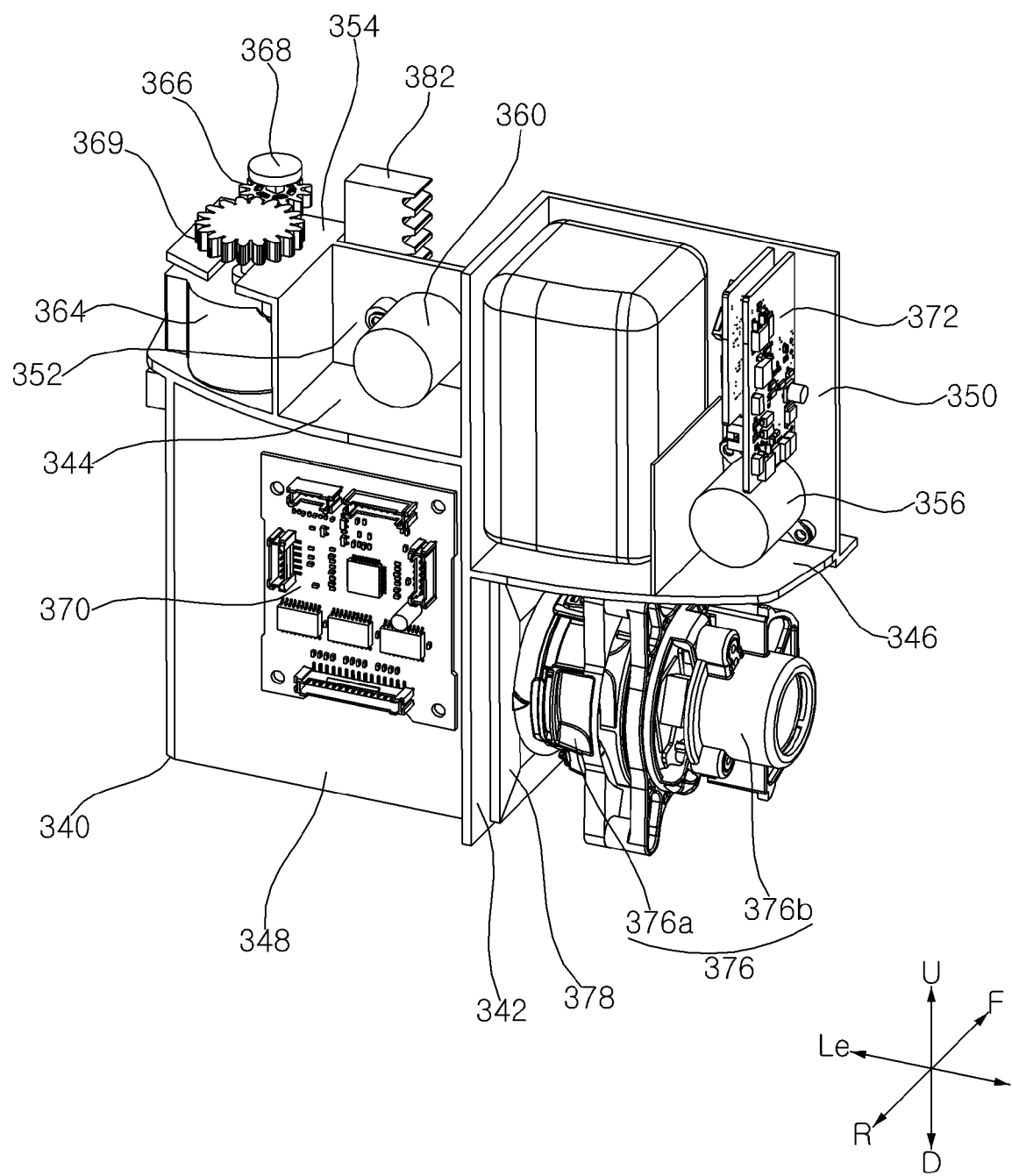
FIG. 17 is a perspective view of the partition plates and components disposed on the partition plates when viewed from a direction different from that of FIG. 16.

Referring to FIGS. 16 and 17, the forward-rearward partitions 348 and 350 may include first forward-rearward partition 348, which may isolate the space in which the dust container 400 is disposed from the space in which the first printed circuit board 370 is disposed, and a second forward-rearward partition 350, which may isolate the space in which the battery 374 is disposed from the space in which the moving gear 358 is disposed.

Referring to FIG. 17, the partition wall 340 may include a first support plate 352, which is disposed on the first horizontal partition 344 to support placement of the dust container motor 360, and a second support plate 354, which is disposed above the first horizontal partition 344 to support placement of the agitator gear 366 and the agitator connection shaft 368. The dust container 400 may be disposed below the first horizontal partition 344. The dust container 400 may be disposed on or at one side of the vertical partition 342.

The dust container guide 380 may be disposed above the dust container 400. The dust container guide 380 may be connected to the dust container gear 362 to displace the dust container 400.

Figure 18:
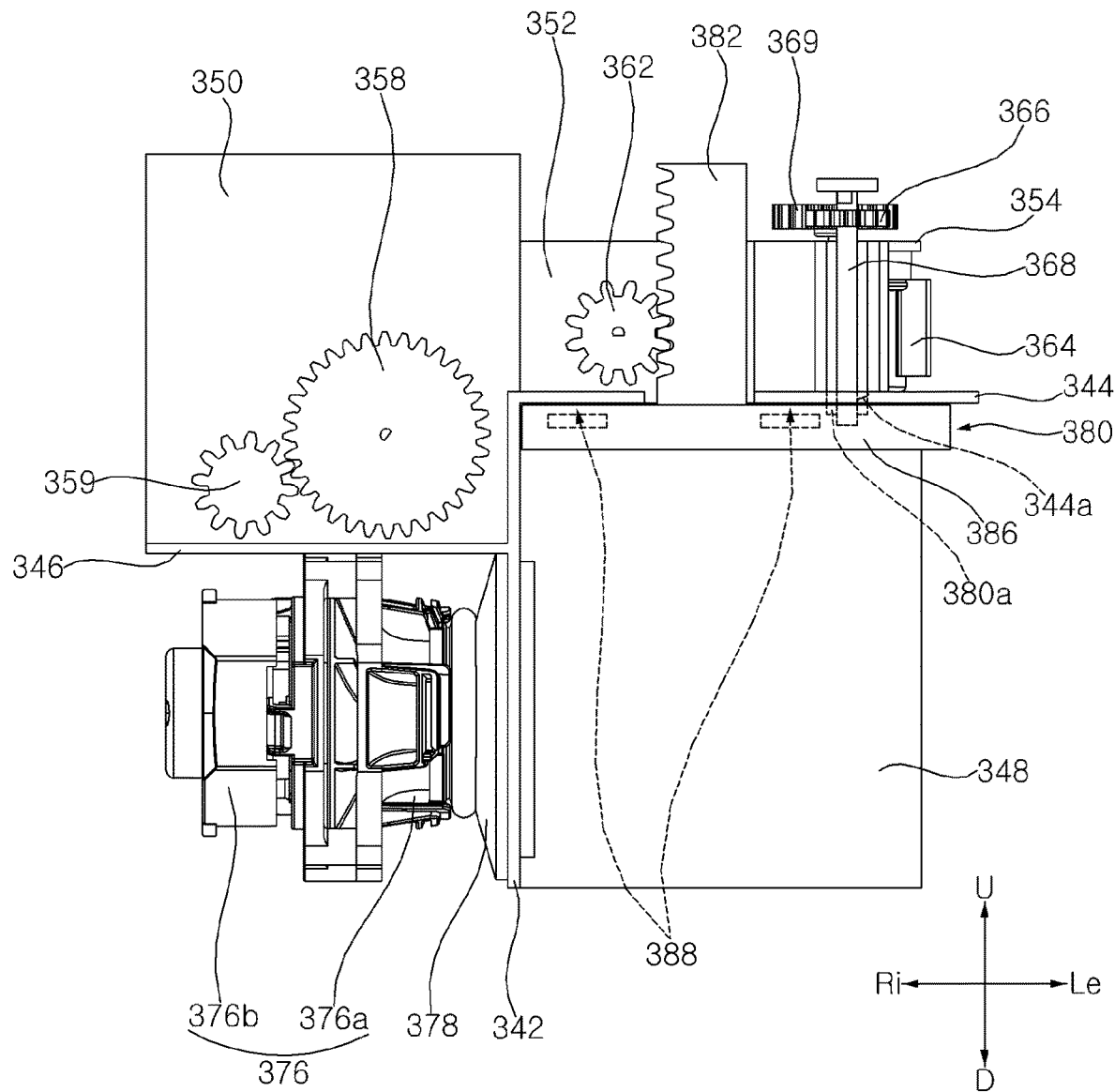
FIG. 18 is a rear view of the partition plates of FIG. 16.

Referring to FIG. 18, the dust container guide 380 may include a guide plate 384, which is disposed above the dust container 400, and a guide gear 382, which extends upwards from the guide plate 384 and is engaged with the dust container gear 362. The guide plate 384 may be disposed below the first horizontal partition 344. A magnet 388 may be disposed on the guide plate 384. Accordingly, when the dust container 400 is brought into contact with the magnet 388, the dust container 400 may be secured to the dust container guide 380 by the magnet 388.

Referring to FIG. 16, the dust container guide 380 may include mounting guides 386, which are bent and extend downwards from a front end and a rear end of the guide plate 384. When the dust container 400 moves to the guide plate 384, the mounting guides 386 may guide the dust container 400 to move to a correct position on the guide plate 384.

Referring to FIG. 18, the guide plate 384 may have a connection hole 380a formed therein to allow the agitator connection shaft 368 to pass therethrough. The connection hole 380a may be formed at a position corresponding to the shaft hole 344b formed in the first horizontal partition 344. When the dust container 400 is mounted in the housings, the shaft hole 344b and the connection hole 380a may be located so as to be aligned with each other.

The guide gear 382 may be disposed through the guide hole 344a formed in the first horizontal partition 344. The guide gear 382 may be implemented, for example, as a rack gear. The guide gear 382 may mesh with the dust container gear 362. The guide gear 382 may move in the upward-downward direction in response to rotation of the dust container gear 362. Accordingly, when the dust container motor 360 operates, the dust container guide 380 may move in the upward-downward direction. The dust container motor 360 may be disposed above the first horizontal partition 344, and be mounted to the first support plate 352.

The first printed circuit board 370 may be disposed on a rear surface of the first forward-rearward partition 348.

Referring to FIG. 18, the suctioner 376 may be disposed below the second horizontal partition 346. The suctioner 376 may be disposed on an opposite side of the vertical partition 342. The suctioner 376 may include a fan 376a, which causes air to flow, and a fan motor 376b, which rotates the fan 376a. A connection pipe 378 that connects the suctioner 376 to the vertical partition 342 may be disposed at one side of the suctioner 376. The connection pipe 378 may be fixed to a portion of the vertical partition 342 in which the communication hole 342a is formed, thereby inducing air to flow from the dust container 400 to the suctioner 376.

Referring to FIG. 17, the battery 374 may be disposed above the second horizontal partition 346. The battery 374 may be disposed above the suctioner 376. A second printed circuit board 372 and a gear motor 356 that rotates the moving gear 358 may be disposed in the space in which the battery 374 is disposed. The second printed circuit board 372 and the moving gear 358 may be mounted to the second forward-rearward partition 350.

The moving gear 358 and a connection gear 359, which meshes with the moving gear 358 and which is connected to the gear motor 356, may be disposed in front of the second forward-rearward partition 350. The moving gear 358 may have a larger radius than the connection gear 359.

Referring to FIG. 17, the agitator motor 364 and the agitator gear 366 may be disposed above the first horizontal partition 344. The second support plate 354 may be spaced upwards apart from the first horizontal partition 344. The second support plate 354 may be disposed to extend parallel to the first horizontal partition 344. The agitator motor 364 may be disposed below the second support plate 354. The agitator gear 366 and an auxiliary gear 369, which is connected to the agitator motor 364 and which meshes with the agitator gear 366, may be disposed above the second support plate 354.

The agitator gear 366 may be fixedly disposed on a circumference of the agitator connection shaft 368. Accordingly, when the agitator gear 366 rotates, the agitator connection shaft 368 also rotates together therewith. The agitator connection shaft 368 may be disposed so as to penetrate the second horizontal partition 346. The agitator connection shaft 368 may have a circular-shaped section. However, a lower end 368a of the agitator connection shaft 368 may have an elliptical-shaped or polygonal-shaped section in order to transmit a rotational force to the agitator 420.

Figure 22:
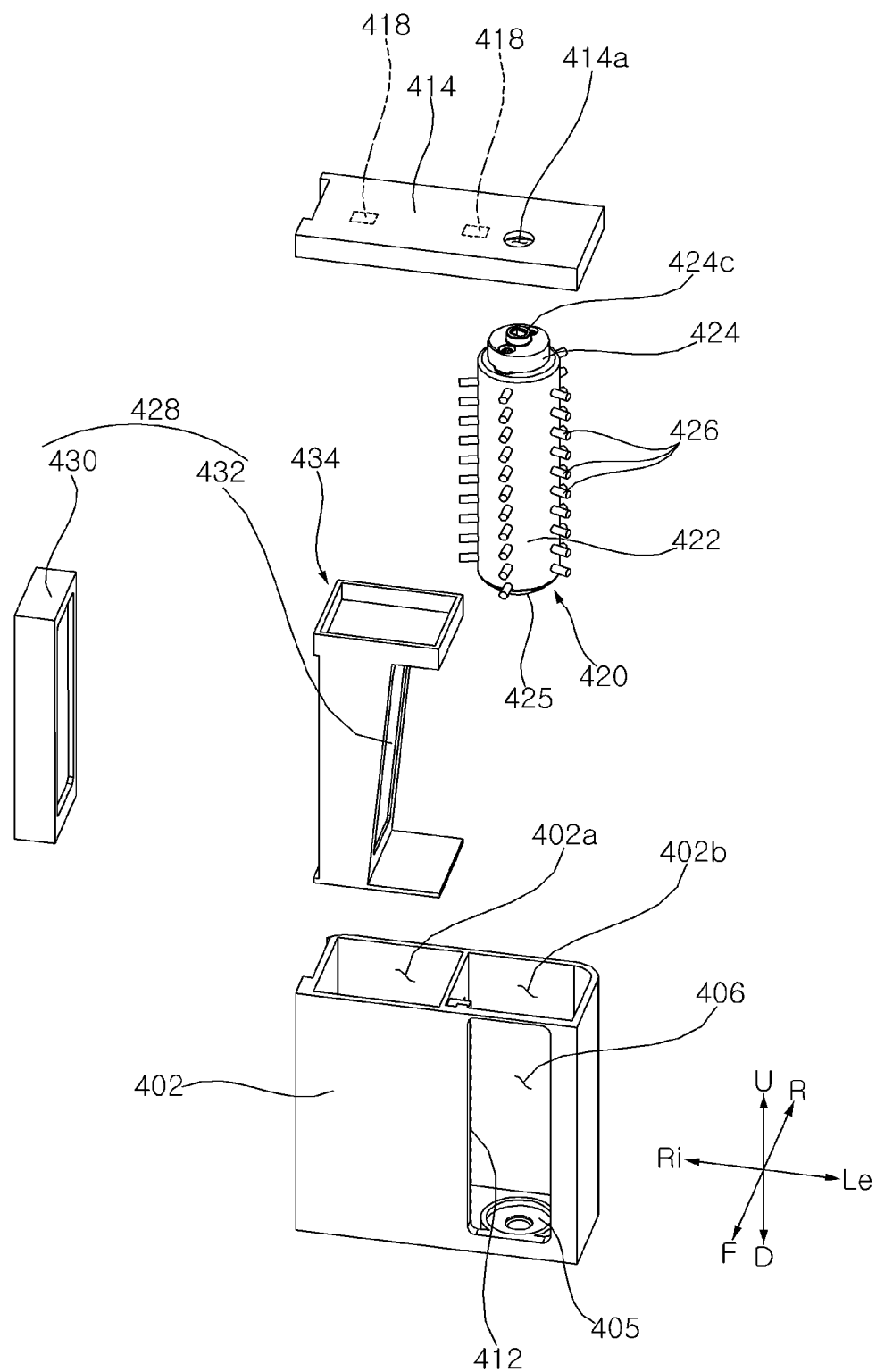
FIG. 22 is an exploded perspective view of the dust container of FIG. 19.

Referring to FIG. 22, the dust container 400 may include a storage space 402a, in which foreign substances removed from the pre-filter 188 may be stored, a dust container housing 402, which forms an agitator space 402b in which the agitator 420 may be disposed, a dust container cover 414, which covers an open side of the dust container housing 402, an agitator 420, which may be rotatably disposed inside of the dust container housing 402, and a dust container filter 428, which may be disposed at one side of the dust container housing 402 in order to remove foreign substances from the air discharged from the dust container housing 402.

Referring to FIG. 22, the agitator space 402b in which the agitator 420 is disposed and the storage space 402a in which dust is stored may be formed inside of the dust container housing 402. The dust container housing 402 may have an open upper portion. Accordingly, the agitator 420 or the dust container filter 428 may be withdrawn out of the dust container housing 402 through the open upper portion of the dust container housing 402.

The dust container housing 402 may have an agitator hole 406 formed therein to allow the agitator space 402b to communicate with the outside. A portion of the agitator 420 may be exposed to the outside of the dust container housing 402 through the agitator hole 406. The agitator hole 406 may have a size corresponding to a size of the suction hole 302a in the first housing 302.

Figure 19:
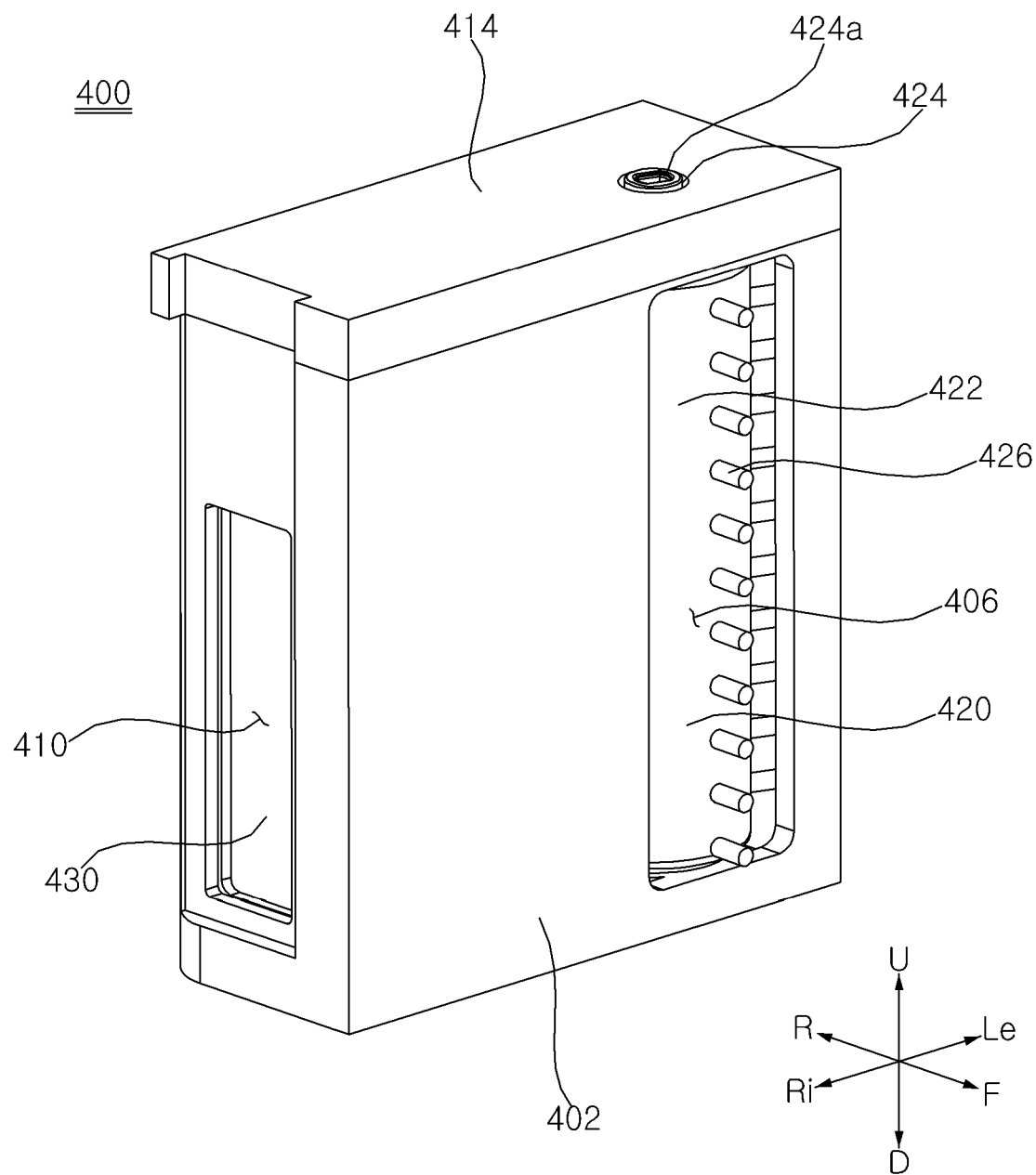
FIG. 19 is a perspective view of a dust container according to an embodiment.
Figure 20:
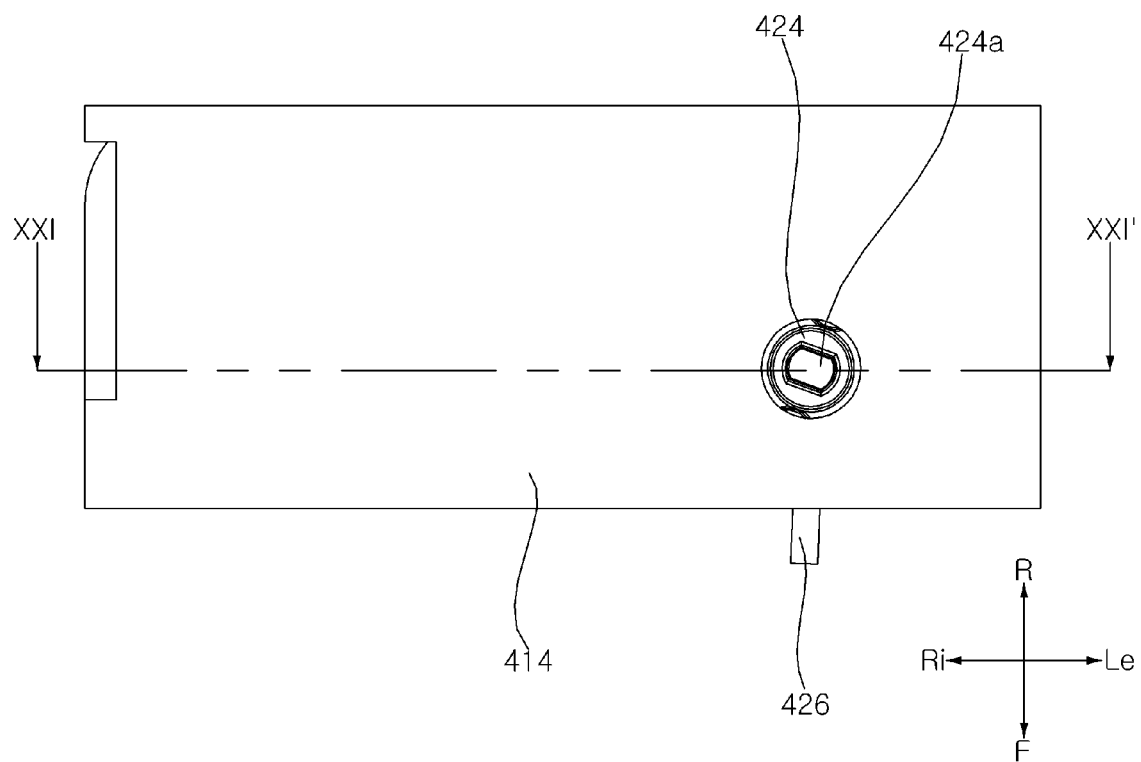
FIG. 20 is a plan view of the dust container of FIG. 19.

Referring to FIG. 19, the dust container housing 402 may have a flow hole 410 formed therein to allow the air in the storage space 402a to flow to outside of the dust container housing 402. The flow hole 410 may be formed in a lateral surface of the dust container housing 402. The flow hole 410 may have a size corresponding to a size of the communication hole 342a in the vertical partition 342. When the dust container housing 402 is disposed inside of the housings 302 and 330, the flow hole 410 may be disposed at a position corresponding to the communication hole 342a.

Figure 21:
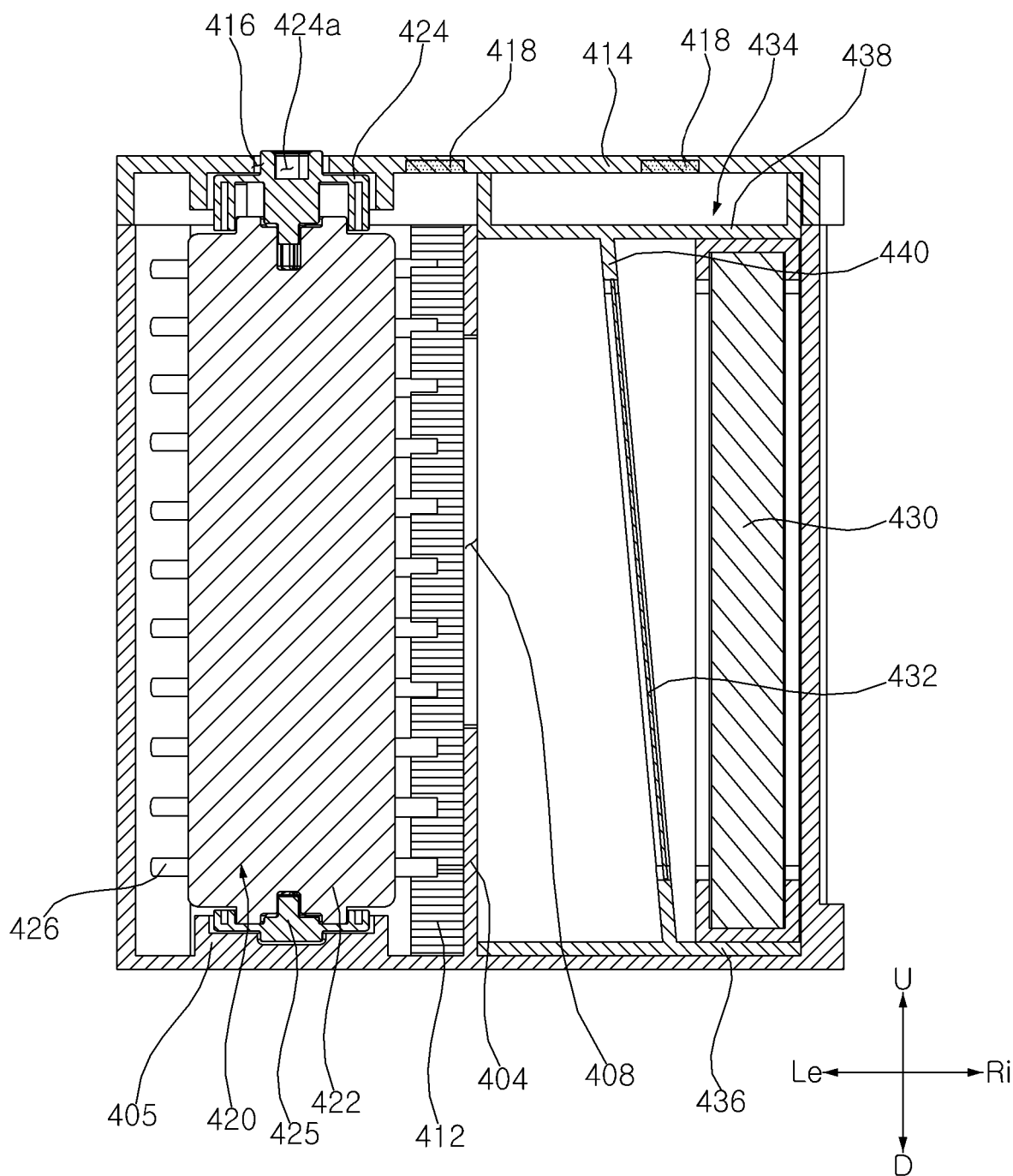
FIG. 21 is a cross-sectional view, taken along line XXI-XXI' in FIG. 20.

Referring to FIG. 21, an inner partition 404 configured to isolate the storage space 402a and the agitator space 402b from each other may be disposed in the dust container housing 402. The inner partition 404 may extend in the upward-downward direction. The inner partition 404 may have an inner hole 408 formed therein to allow the storage space 402a and the agitator space 402b to communicate with each other.

Referring to FIG. 21, a duster 412 may be disposed in the agitator space 402b so as to be in contact with an end portion of the agitator 420. The duster 412 may remove foreign substances from a blade 426 of the agitator 420, which will be described hereinafter. The duster 412 may be disposed so as to rub the blade 426 when the agitator 420 rotates. The duster 412 may be disposed so as to protrude toward the agitator 420. The duster 412 may have a sawtooth shape, and be disposed on or at one side of the inner hole 408.

The duster 412 may protrude so as to contact the blade 426. Accordingly, when the agitator 420 operates, the duster 412 may remove foreign substances from the blade 426 of the agitator 420. Also, when the dust container 400 is removed from the filter cleaner 300, the duster 412 may prevent the foreign substances stored in the storage space 402a from escaping to the outside through the agitator space 402b.

Referring to FIG. 21, an agitator-mounting part or portion or agitator mount 405, to which the agitator 420 may be mounted, may be disposed in the dust container housing 402. The agitator-mounting portion 405 may be disposed at a lower portion of the agitator space 402b, and a lower end portion of the agitator 420 may be seated on the agitator-mounting portion 405.

Referring to FIG. 22, the dust container cover 414 may cover the open upper portion of the dust container housing 402. The dust container cover 414 may have therein a through-hole 416, through which a lower portion of the agitator connection shaft 368 may pass. The through-hole 416 may be formed at a position corresponding to the connection hole 380a formed in the guide plate 384 of the dust container guide 380. Accordingly, when the dust container 400 is mounted to the dust container guide 380, the connection hole 380a and the through-hole 416 may be located so as to be aligned with each other.

Referring to FIG. 22, a counterpart member or counterpart 418, which responds to the magnet 388 disposed on the guide plate 384, may be disposed on the dust container cover 414. The counterpart 418 may be made of a material that is attracted to the magnet 388. Accordingly, when the dust container 400 is brought close to the dust container guide 380, the dust container 400 may be secured to the dust container guide 380 due to the magnet 388 and the counterpart 418.

The agitator 420 may be rotatably mounted to the dust container housing 402. The agitator 420 may rotate about a rotational axis that extends in the upward-downward direction. The agitator 420 may be disposed so as to be in contact with an outer side of the pre-filter 188. The agitator 420 may shake foreign substances off of the pre-filter 188.

Referring to FIG. 22, the agitator 420 includes a rotational body 422, which rotates about a rotational axis that extends in the upward-downward direction, a plurality of blades 426, which protrude from an outer circumferential surface of the rotational body 422 in a radial direction, and a connection body 424, which is disposed at one end of the rotational body 422 and which is connected to the agitator connection shaft 368.

The agitator 420 further includes a mounting body 425, which is rotatably connected to the rotational body 422. The mounting body 425 may be mounted to the agitator-mounting portion 405 of the dust container housing 402 in order to fix the agitator 420 in place. As the mounting body 425 is rotatably connected to the rotational body 422, the agitator 420 may rotate stably in a state of being fixed to the agitator-mounting portion 405.

The connection body 424 may be disposed at an upper side of the rotational body 422. The connection body 424 may include a connection recess 424a formed in an upper surface thereof to allow a lower end of the agitator connection shaft 368 to be inserted thereinto. The connection recess 424a may have a shape corresponding to a shape of the lower end of the agitator connection shaft 368. Accordingly, when the agitator connection shaft 368 is inserted into the connection recess 424a in the connection body 424, the agitator connection shaft 368 and the agitator 420 may rotate together.

Referring to FIG. 21, the dust container filter 428 may be disposed in the storage space 402a in the dust container housing 402. The dust container filter 428 may include a first filter 430, which is disposed on one side of the flow hole 410 in the dust container housing 402 to remove fine foreign substances from the air flowing to the flow hole 410, a second filter 432, which is disposed in the storage space 402a while being spaced apart from the first filter 430, and a mounting body 434, which fixes the second filter 432 in place.

Referring to FIG. 21, the mounting body 434 may have a structure configured to be mounted in the storage space 402a. The mounting body 434 may include a lower plate 436, which is disposed at a lower side of the storage space 402a, an upper plate 438, which is disposed so as to be spaced upwards apart from the lower plate 436, and a connection plate 440, which interconnects the lower plate 436 and the upper plate 438 and supports the second filter 432, which is disposed on one side thereof.

Referring to FIG. 21, the lower plate 436 may be fixed to a lower portion of the storage space 402a. The upper plate 438 may be fixed to an upper portion of the storage space 402a. Accordingly, when the dust container filter 428 is disposed in the storage space 402a, a position of the dust container filter 428 inside of the storage space 402a may be maintained. The second filter 432 may be fixedly disposed on the mounting body 434. That is, the second filter 432 may be integrally formed with the connection plate 440.

Referring to FIG. 21, the connection plate 440 may be disposed so as to be inclined relative to the first filter 430. The second filter 432 may be spaced apart from the first filter 430, and may be inclined relative to the first filter 430.

The first filter 430 may be implemented as, for example, a high-efficiency particulate air (HEPA) filter to remove fine foreign substances. The second filter 432 may implemented as, for example, a filter that removes foreign substances having a size larger than a size of foreign substances removed by the first filter 430. The second filter 432 may be implemented as, for example, a filter that is capable of being washed for reuse.

The first filter 430 may be mounted in the mounting body 434. The first filter 430 may be disposed between the upper plate 438 and the lower plate 436 of the mounting body 434.

Hereinafter, a process of separating the dust container 400 from the filter cleaner 300 will be described with reference to FIGS. 23 and 24.

The filter cleaner 300 may be maintained in a state in which it is mounted on the guide rail 10. Therefore, it may be difficult for a user to reach the filter cleaner 300 mounted in a ceiling-mounted air-processing apparatus 100. However, according to embodiments disclosed herein, as the dust container 400 is capable of being moved downwards by the dust container guide 380, the user may easily reach the same.

The dust container 400 may be moved in the upward-downward direction by the dust container guide 380. The dust container guide 380 may be moved in the upward-downward direction by operation of the dust container gear 362.

The dust container 400 may be securely disposed on the dust container guide 380 by the magnet 388 of the dust container guide 380. The magnet 388 of the dust container guide 380 attracts the counterpart 418 of the dust container 400, so the dust container 400 may be secured to the dust container guide 380.

The dust container 400 may be located at a first position P1, at which the same is located inside of the housings 302 and 330, or a second position P2, at which a portion of the dust container 400 is located outside the housings 302 and 330. When the dust container 400 is located at the first position P1, the agitator 420 is connected to the agitator connection shaft 368. Accordingly, when the dust container 400 is located at the first position P1, the agitator 420 may be rotated by the operation of the agitator motor 364.

Figure 23:
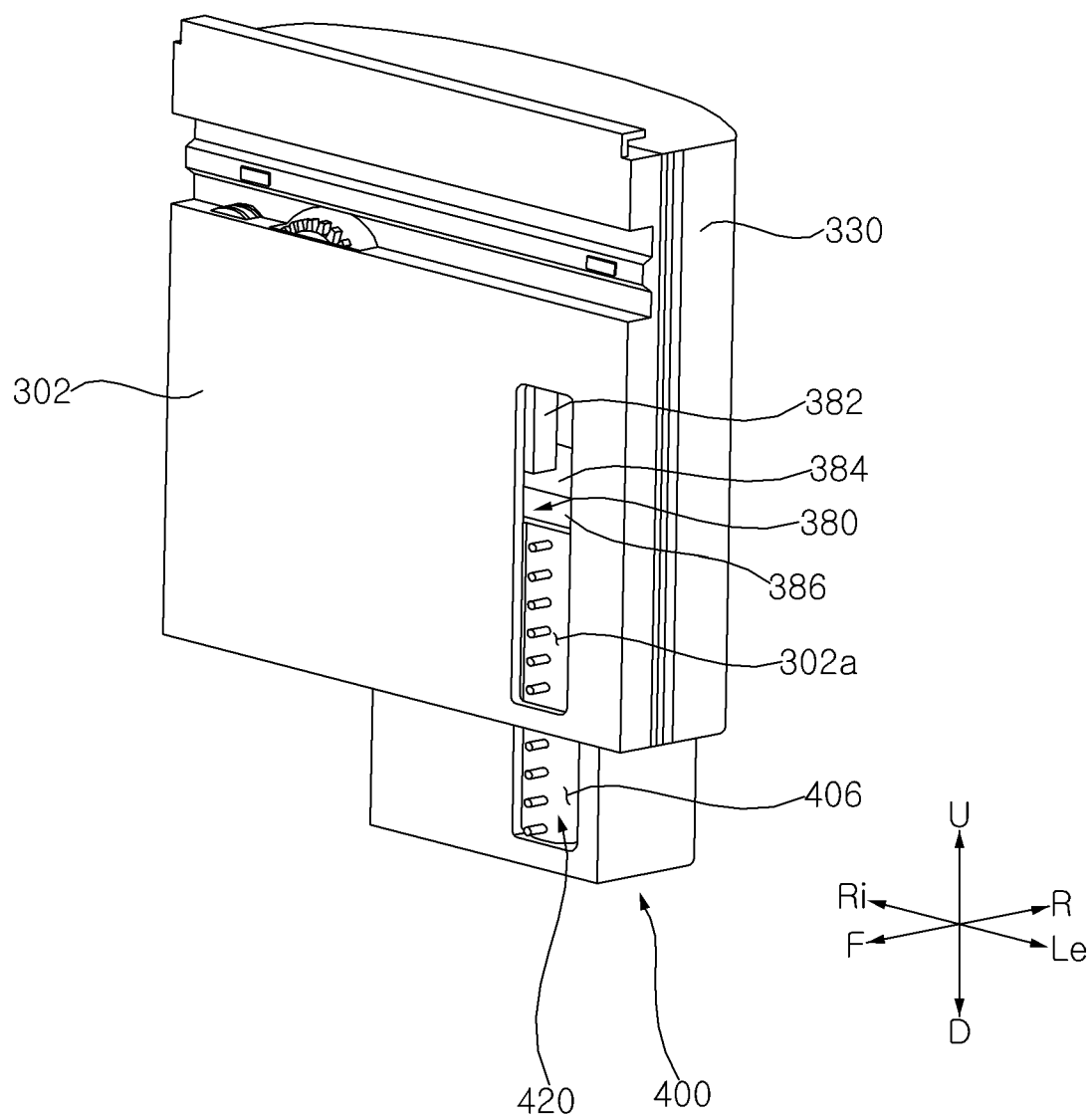
FIG. 23 is a perspective view showing a state in which a dust container and a dust-container-mount are moved downwards in the filter cleaner.

As shown in FIG. 23, when the dust container 400 is located at the second position P2, the agitator 420 is separated from the agitator connection shaft 368. Accordingly, when the dust container 400 is located at the second position P2, the agitator 420 is not rotated even when the agitator motor 364 operates. Thereafter, the user may separate the dust container 400 from the filter cleaner 300, as shown in FIG. 24.

As is apparent from the above description, an air-processing apparatus according to embodiments disclosed herein has at least one or more advantages as follows.

First, the agitator is disposed inside of the dust container, and the dust container is mounted in the housing of the filter cleaner. Accordingly, the dust container and the agitator, in which foreign substances may be present, are capable of being managed together, whereby it is possible to maintain cleanliness of the filter cleaner.

Second, as the dust container is capable of being moved downwards from the filter cleaner by the dust container guide, a user is capable of easily separating and replacing the dust container even when the filter cleaner is used in a product which is mounted on a ceiling.

Third, as the agitator is disposed inside of the dust container, a region in which foreign substances are stored communicates with the outside via the agitator region. Due to this structure, when the dust container is separated, it is possible to minimize an amount of foreign substances that escapes from the dust container to the outside.

Fourth, the filter cleaner is capable of moving stably along the guide rail due to the guide rollers provided so as to move along the guide rail and the support roller disposed on the guide rail. Further, as the rotational axis of the support roller extends in a direction different from that in which the rotational axes of the guide rollers extend, it is possible to maintain a constant gap between the filter and the filter cleaner below the guide rail.

Fifth, the filter cleaner includes therein a battery, and when the filter cleaner is located in a non-cleaning section, the battery is charged by receiving external power through terminals. As such, as the filter cleaner does not require an electric wire for connection to an external power source, the filter cleaner is capable of moving freely.

Embodiments disclosed herein provide a filter cleaner enabling a user to easily manage a dust container and an agitator mounted therein. Embodiments disclosed herein further provide a filter cleaner enabling a user to easily reach a dust container when used in a ceiling-mounted product.

Embodiments disclosed herein provide a filter cleaner capable of minimizing an amount of foreign substances escaping from a dust container to the outside when a dust container is separated, and an air-processing apparatus including a filter cleaner. Embodiments disclosed herein further provide an air-processing apparatus including a filter cleaner configured to clean a filter disposed in an inlet formed in a lateral direction while moving stably. That is, a filter cleaner configured to move while maintaining a constant spacing distance between the filter cleaner and the filter disposed in the inlet and an air-processing apparatus including a filter cleaner are provided.

Embodiments disclosed herein provide an air-processing apparatus capable of minimizing movement constraints on a filter cleaner. Embodiments disclosed herein furthermore provide an air-processing apparatus including a filter cleaner from which a dust container is easily separated.

Advantages of embodiments disclosed herein are not limited to the above-described advantages, and other advantages not mentioned herein may be readily understood by those skilled in the art from the following description.

Embodiments disclosed herein provide a filter cleaner that may include a housing forming an external appearance of the filter cleaner and having a suction hole formed in one or a first side thereof and a discharge hole formed in another or a second side thereof, a moving gear rotatably disposed in the housing to move the housing, a gear motor configured to rotate the moving gear, a dust container disposed so as to be introduced into or withdrawn out of the housing and configured to store foreign substances introduced thereinto through the suction hole and to accommodate an agitator rotatably disposed therein, an agitator gear disposed inside of the housing to rotate the agitator, an agitator motor disposed inside of the housing to operate the agitator gear, and a suctioner disposed inside of the housing to induce air to flow into the dust container through the suction hole. When the dust container is mounted in the housing, the agitator gear may be connected to the agitator, thereby making it possible to separate the agitator disposed in the dust container.

The dust container may include a dust container housing having formed therein a storage space in which foreign substances removed from a filter are stored and an agitator space in which the agitator is disposed. The dust container housing may have an agitator hole formed therein to allow the agitator space to communicate with the outside. When the dust container is mounted in the housing, the agitator hole may be located at a position corresponding to the suction hole. That is, when the dust container is mounted in the housing, the agitator is capable of operating.

The dust container housing may have a flow hole formed therein to allow the storage space to communicate with the outside of the dust container housing. The dust container may include a dust container filter disposed in the storage space to remove foreign substances from air flowing to the flow hole. When the dust container is mounted in the housing, the suctioner may communicate with the flow hole. Accordingly, air may be introduced into the dust container by operation of the suctioner.

The dust container filter may include a first filter disposed on one side of the flow hole in the dust container housing, a second filter disposed so as to be spaced apart from the first filter, and a mounting body configured to fix positions of the first filter and the second filter disposed inside of the dust container housing. Accordingly, the first filter and the second filter may be stably disposed inside of the dust container.

The mounting body may include a lower plate disposed in the lower side of the storage space, an upper plate disposed so as to be spaced upwards apart from the lower plate, and a connection plate configured to interconnect the lower plate and the upper plate and to support the second filter disposed on one side thereof.

The second filter may have a mesh shape, and may be formed integrally with the connection plate. Accordingly, it is possible to easily manage the second filter.

The connection plate on which the second filter is disposed may be inclined relative to the first filter. Accordingly, a region in which the second filter is disposed may be increased inside of the storage space.

The first filter may be fixedly disposed between the lower plate and the upper plate. Accordingly, the first filter may be stably disposed inside of the dust container housing.

The dust container may include an inner partition configured to isolate the storage space and the agitator space from each other inside of the dust container housing. The inner partition may have an inner hole formed therein to allow the storage space and the agitator space to communicate with each other. Accordingly, foreign substances introduced into the agitator space may be introduced into the storage space.

A duster may be disposed in the agitator space so as to be in contact with an end portion or end of the agitator. Accordingly, it is possible to remove foreign substances from the agitator and to prevent foreign substances introduced into the storage space from escaping to the outside.

The filter cleaner may further include an agitator connection shaft configured to transmit a rotational force of the agitator gear to the agitator. The agitator gear may be fixedly disposed on a circumference of the agitator connection shaft so as to rotate together with the agitator connection shaft. Accordingly, when the dust container is mounted in the housing, the agitator is capable of being rotated.

The agitator may have a connection recess formed therein to allow the agitator connection shaft to be inserted thereinto. When the dust container is mounted in the housing, the agitator connection shaft may be inserted into the connection recess. That is, when the dust container is mounted in the housing, the agitator is capable of being rotated.

The agitator connection shaft may have an end portion or end connected to the agitator, and the end portion of the agitator connection shaft may have an elliptical-shaped or polygonal-shaped section. The connection recess may have a shape corresponding to the end portion of the agitator. Accordingly, when the agitator shaft is inserted into the connection recess, the rotational force of the agitator shaft may be transmitted to the agitator.

The dust container may include a dust container guide configured to displace the dust container disposed in the housing, and the dust container guide may have a connection hole formed therein to allow the agitator connection shaft to pass therethrough. Accordingly, the dust container guide may displace the dust container, and may connect the agitator depending on the displacement of the dust container.

The dust container guide may include a guide plate, which is disposed above the dust container, and a guide gear, which extends upwards from the guide plate and meshes with a dust container gear. A magnet may be disposed on the guide plate to fix the dust container. Accordingly, the dust container may be fixed to the guide plate.

The dust container guide may include mounting guides to guide the dust container to move to the correct position on the guide plate when the dust container moves upwards, and the mounting guides may be bent and extend downwards from the front end and the rear end of the guide plate. Accordingly, the dust container mounted by the dust container guide may be disposed at the correct position.

The filter cleaner may further include a partition wall disposed inside of the housing to partition the inner space in the housing. The dust container guide may be movably disposed on the partition wall.

The partition wall may include a horizontal partition to partition the inner space in the housing in an upward-downward direction. The dust container gear may be disposed above the horizontal partition to move the dust container guide. The dust container guide may be movably disposed below the horizontal partition. Accordingly, the dust container gear may be stably disposed, and thus, the dust container guide, which meshes with the dust container gear, may be stably moved.

The agitator gear may be connected to the agitator motor above the horizontal partition. The horizontal partition may have a shaft hole formed therein to allow the agitator connection shaft to pass therethrough. When the dust container is mounted in the housing, the shaft hole and the connection hole may be located so as to be aligned with each other. Accordingly, when the dust container is mounted in the housing, the agitator shaft may be connected to the agitator.

Embodiments disclosed herein further provide an air-processing apparatus that may include a case having therein an outlet formed so as to be open in a downward direction and an inlet formed so as to be open in a direction perpendicular to the outlet, a filter disposed in the inlet, a guide rail disposed above the inlet, and a filter cleaner configured to move along the guide rail to remove foreign substances from the filter. The filter cleaner may include a housing forming an external appearance of the filter cleaner and having a suction hole formed in one or a first side thereof and a discharge hole formed in another or a second side thereof, a moving gear rotatably disposed in the housing to move the housing, a gear motor configured to rotate the moving gear, a dust container disposed so as to be introduced into or withdrawn out of the housing and configured to store foreign substances introduced thereinto through the suction hole and to accommodate an agitator rotatably disposed therein, an agitator gear disposed inside of the housing to rotate the agitator, an agitator motor disposed inside of the housing to operate the agitator gear, and a suctioner disposed inside of the housing to induce air to flow into the dust container through the suction hole. When the dust container is mounted in the housing, the agitator gear may be connected to the agitator.

An air-processing apparatus according to embodiments disclosed herein may include a case, which forms an external appearance of the air-processing apparatus and has an inlet formed in one or a first side thereof, a filter disposed in the inlet, a guide rail disposed above the inlet, and a filter cleaner configured to move along the guide rail and to remove foreign substances from the filter. The filter cleaner may include a housing disposed so as to face the filter and to move along the guide rail, a moving gear configured to mesh with the guide rail and to move the housing in a lateral or lateral direction of the filter, a gear motor configured to rotate the moving gear, a dust container disposed inside of the housing and having formed therein a space for storing foreign substances, an agitator disposed inside of the housing and configured to rotate while contacting the filter, a suctioner configured to deliver foreign substances removed from the agitator to the dust container, a guide roller rotatably disposed in the housing and configured to move along the guide rail and to maintain a gap between the filter and a surface of the housing that faces the filter, and a support roller rotatably disposed in the housing and contacting the case. The support roller may be disposed above the guide roller. A rotational axis of the support roller may extend in a direction different from that in which a rotational axis of the guide roller extends. Accordingly, the filter cleaner, which moves along the guide rail of the case, may be stably disposed.

Other advantages will be apparent from the description and the drawings.

The advantages of embodiments are not limited to the above-described effects, and other advantages not mentioned herein may be clearly understood by those skilled in the art from the accompanying claims.

Although embodiments have been described with reference to specific embodiments shown in the drawings, it will be apparent to those skilled in the art that the embodiments are not limited to those exemplary embodiments and may be embodied in many forms without departing from the scope, which is set forth in the following claims. These modifications should not be understood separately from the technical spirit or scope.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A filter cleaner, comprising:
   a housing that forms an external appearance of the filter cleaner, the housing having a suction hole formed in one side thereof;
   a moving gear rotatably disposed in the housing and configured to move the housing;
   a gear motor configured to rotate the moving gear;
   a dust container disposed so as to be introduced into or withdrawn out of the housing, the dust container being configured to store foreign substances introduced thereinto through the suction hole;
   an agitator gear disposed inside of the housing to rotate the agitator;
   an agitator motor disposed inside of the housing to operate the agitator gear; and
   a suctioner disposed inside of the housing to induce air to flow into the dust container through the suction hole,
   wherein the dust container is configured to be inserted into or withdrawn from the housing in a direction in which a rotational axis of the agitator extends,
   when the dust container is mounted in the housing, the agitator gear is connected to the agitator.

2. The filter cleaner according to claim 1, wherein the dust container comprises a dust container housing having formed therein a storage space in which foreign substances removed from a filter are stored and an agitator space in which the agitator is disposed, wherein the dust container housing includes an agitator hole formed therein to allow the agitator space to communicate with an outside, and wherein, when the dust container is mounted in the housing, the agitator hole is located at a position corresponding to the suction hole.

3. The filter cleaner according to claim 2, wherein the dust container housing includes a flow hole formed therein to allow the storage space to communicate with the outside of the dust container housing, wherein the dust container comprises a dust container filter disposed in the storage space to remove foreign substances from air flowing through the flow hole, and wherein, when the dust container is mounted in the housing, the suctioner communicates with the flow hole.

4. The filter cleaner according to claim 3, wherein the dust container filter comprises:
- a first filter disposed on one side of the flow hole in the dust container housing;
- a second filter disposed so as to be spaced apart from the first filter; and
- a mounting body configured to fix positions of the first filter and the second filter disposed inside of the dust container housing.

5. The filter cleaner according to claim 4, wherein the mounting body comprises:
- a lower plate disposed at a lower side of the storage space;
- an upper plate disposed so as to be spaced upwards apart from the lower plate; and
- a connection plate configured to connect the lower plate and the upper plate and to support the second filter disposed on the one side thereof.

6. The filter cleaner according to claim 5, wherein the second filter has a mesh shape, and is integrally formed with the connection plate.

7. The filter cleaner according to claim 5, wherein the connection plate on which the second filter is disposed is inclined relative to the first filter.

8. The filter cleaner according to claim 5, wherein the first filter is fixedly disposed between the lower plate and the upper plate.

9. The filter cleaner according to claim 2, wherein the dust container comprises an inner partition configured to isolate the storage space and the agitator space from each other inside of the dust container housing, and wherein the inner partition has an inner hole formed therein to allow the storage space and the agitator space to communicate with each other.

10. The filter cleaner according to claim 9, wherein a duster is disposed in the agitator space so as to be in contact with an end portion of the agitator.

11. The filter cleaner according to claim 1, further comprising:
- an agitator connection shaft configured to transmit a rotational force of the agitator gear to the agitator, wherein the agitator gear is fixedly disposed on a circumference of the agitator connection shaft so as to rotate together with the agitator connection shaft.

12. The filter cleaner according to claim 11, wherein the agitator has a connection recess formed therein to allow the agitator connection shaft to be inserted thereinto, and wherein, when the dust container is mounted in the housing, the agitator connection shaft is inserted into the connection recess.

13. The filter cleaner according to claim 12, wherein the agitator connection shaft has an end portion connected to the agitator, an end portion of the agitator connection shaft having an elliptical-shaped or polygonal-shaped section, and wherein the connection recess has a shape corresponding to the end portion of the agitator.

14. The filter cleaner according to claim 12, wherein the dust container comprises a dust container guide configured to displace the dust container disposed in the housing, and wherein the dust container guide includes a connection hole formed therein to allow the agitator connection shaft to pass therethrough.

15. The filter cleaner according to claim 14, wherein the dust container guide comprises:
- a guide plate disposed above the dust container; and
- a guide gear that extends upwards from the guide plate, the guide gear meshing with a dust container gear, and wherein a magnet is disposed on the guide plate to fix the dust container.

16. The filter cleaner according to claim 15, wherein the dust container guide comprises mounting guides to guide the dust container to move to a correct position on the guide plate when the dust container moves upwards, and wherein the mounting guides are bent and extend downwards from a front end and a rear end of the guide plate.

17. The filter cleaner according to claim 15, further comprising:
- a partition wall disposed inside of the housing and configured to partition an inner space in the housing, wherein the dust container guide is movably disposed on the partition wall.

18. The filter cleaner according to claim 17, wherein the partition wall comprises a horizontal partition configured to partition the inner space in the housing in an upward-downward direction, wherein the dust container gear is disposed above the horizontal partition to move the dust container guide, and wherein the dust container guide is movably disposed below the horizontal partition.

19. The filter cleaner according to claim 18, wherein the agitator gear is connected to the agitator motor above the horizontal partition, wherein the horizontal partition has a shaft hole formed therein to allow the agitator connection shaft to pass therethrough, and wherein, when the dust container is mounted in the housing, the shaft hole and the connection hole are located so as to be aligned with each other.

20. An air-processing apparatus, comprising:
- a case having therein an outlet formed so as to be open in a downward direction and an inlet formed so as to be open in a direction perpendicular to the outlet;
- a filter disposed in the inlet;
- a guide rail disposed above the inlet; and
- a filter cleaner configured to move along the guide rail to remove foreign substances from the filter, wherein the filter cleaner comprises:
- a housing that forms an external appearance of the filter cleaner, the housing having a suction hole formed in one side thereof;
- a moving gear rotatably disposed in the housing and configured to move the housing;
- a gear motor configured to rotate the moving gear;
- a dust container disposed so as to be introduced into or withdrawn out of the housing, the dust container being configured to store foreign substances introduced thereinto through the suction hole,
- an agitator gear disposed inside of the housing to rotate the agitator;
- an agitator motor disposed inside of the housing to operate the agitator gear; and
- a suctioner disposed inside of the housing to induce air to flow into the dust container through the suction hole, and
- wherein the dust container is configured to be inserted into or withdrawn from the housing in a direction in which a rotational axis of the agitator extends,
- when the dust container is mounted in the housing, the agitator gear is connected to the agitator.

* * * * *